United States Patent
Takada et al.

(10) Patent No.: US 8,795,546 B2
(45) Date of Patent: Aug. 5, 2014

(54) MAGNETIC CERAMIC AND PROCESS FOR PRODUCTION THEREOF

(75) Inventors: Jun Takada, Okayama (JP); Hideki Hashimoto, Okayama (JP); Tatsuo Fujii, Okayama (JP); Makoto Nakanishi, Okayama (JP)

(73) Assignee: National University Corporation Okayama University, Okayama (JP)

( * ) Notice: Subject to any disclaimer, the term of this patent is extended or adjusted under 35 U.S.C. 154(b) by 165 days.

(21) Appl. No.: 13/515,358

(22) PCT Filed: Dec. 14, 2010

(86) PCT No.: PCT/JP2010/072504
§ 371 (c)(1),
(2), (4) Date: Jun. 12, 2012

(87) PCT Pub. No.: WO2011/074587
PCT Pub. Date: Jun. 23, 2011

(65) Prior Publication Data
US 2012/0248368 A1    Oct. 4, 2012

(30) Foreign Application Priority Data

Dec. 15, 2009  (JP) ................................ 2009-284457
Jan. 8, 2010   (JP) ................................ 2010-003270
Sep. 24, 2010  (JP) ................................ 2010-213282

(51) Int. Cl.
| | | |
|---|---|---|
| C01G 49/08 | (2006.01) | |
| C01G 49/06 | (2006.01) | |
| C04B 35/622 | (2006.01) | |
| H01F 1/11 | (2006.01) | |
| H01F 1/34 | (2006.01) | |
| B82B 1/00 | (2006.01) | |
| B82B 3/00 | (2006.01) | |
| H01F 1/42 | (2006.01) | |
| H01F 1/10 | (2006.01) | |
| C04B 35/628 | (2006.01) | |
| B82Y 30/00 | (2011.01) | |

(52) U.S. Cl.
CPC ............ *H01F 1/344* (2013.01); *C01P 2004/04* (2013.01); *C04B 2235/526* (2013.01); *C04B 2235/3272* (2013.01); *H01F 1/42* (2013.01); *C01P 2004/64* (2013.01); *C01P 2004/13* (2013.01); *C01P 2002/77* (2013.01); *C01P 2004/03* (2013.01); *C04B 2235/5284* (2013.01); *H01F 1/10* (2013.01); *C01P 2002/72* (2013.01); *C01P 2002/02* (2013.01); *C01G 49/06* (2013.01); *C01P 2006/42* (2013.01); *C04B 35/62807* (2013.01); *C04B 2235/5264* (2013.01); *B82Y 30/00* (2013.01); *C04B 35/62231* (2013.01); *C01G 49/08* (2013.01); *Y10S 977/773* (2013.01); *Y10S 977/811* (2013.01); *Y10S 977/838* (2013.01)

USPC ........ 252/62.56; 252/62.59; 501/32; 977/773; 977/811; 977/838

(58) Field of Classification Search
USPC ............... 501/32; 252/62.56, 62.59; 977/773, 977/811, 838
See application file for complete search history.

(56) References Cited

U.S. PATENT DOCUMENTS

| 4,886,752 A * | 12/1989 | Lovley .......................... 435/168 |
| 6,444,453 B1 * | 9/2002 | Lauf et al. ..................... 435/168 |
| 2004/0126902 A1 | 7/2004 | Nishiya et al. |
| 2005/0260600 A1 | 11/2005 | Matsunaga et al. |

FOREIGN PATENT DOCUMENTS

| JP | 10-338526 | 12/1998 |
| JP | 2004-031792 | 1/2004 |
| JP | 2004-150797 | 5/2004 |
| JP | 2006-104021 | 4/2006 |
| JP | 2006-280277 | 10/2006 |

OTHER PUBLICATIONS

International Search Report issued Mar. 22, 2011 in International (PCT) Application No. PCT/JP2010/072504, of which the present application is the national stage.
S. Kahani et al., "A new method for preparation of magnetite from iron oxyhydroxide or iron oxide and ferrous salt in aqueous solution", Journal of Magnetism and Magnetic Materials, vol. 321, No. 13, pp. 1951-1954, 2009.
N. Horiishi, "Kinousei Sanka teppun to Sono Ouyou (Functional Iron Oxide Powder and Application Thereof)", Yoneda Shuppan, Chapter 4, pp. 63-93 and Chapter 6, pp. 107-117, 2006.
M. Maeda et al., "Magnetic carriers of iron nanoparticles coated with a functional polymer for high throughput bioscreening", Journal of Applied Physics, vol. 99, 08H103, 2006.
C. Jia et al., "Single-Crystalline Iron Oxide Nanotubes", Angewandte Chem. Int. Ed,. vol. 44, pp. 4328-4333, 2005.
C. Jia et al., "Large-Scale Synthesis of Single-Crystalline Iron Oxide Magnetic Nanorings", Journal of American Chemical Society, vol. 130, No. 50, pp. 16968-16977, 2008.

(Continued)

*Primary Examiner* — Carol M Koslow
(74) *Attorney, Agent, or Firm* — Wenderoth, Lind & Ponack, L.L.P.

(57) ABSTRACT

This invention relates to a magnetic ceramic material comprising, as main components, (a) at least one magnetic iron oxide selected from the group consisting of $Fe_3O_4$ and $\gamma\text{-}Fe_2O_3$, and (b) an amorphous phase, and a process for producing a magnetic ceramic material, comprising (1) heating a microorganism-derived iron oxide ceramic material containing an iron atom, and (2) reducing the iron oxide ceramic material obtained in Step (1) by heating in the presence of hydrogen gas.

14 Claims, 14 Drawing Sheets

(56) References Cited

OTHER PUBLICATIONS

S. Zhan et al., "Facile fabrication of long α-$Fe_2O_3$, α-Fe and γ-$Fe_2O_3$ hollow fibers using sol-gel combined co-electrospinning technology", Journal of Colloid and Interface Science, vol. 308, pp. 265-270, 2007.

Z. Liu et al., "Single Crystalline Magnetite Nanotubes", Journal of American Chemical Society, vol. 127, No. 1, pp. 6-7, 2005.

S. Chen et al., "One-step wet chemistry for preparation of magnetite nanorods", Materials Letters, vol. 59, pp. 985-988, 2005.

English translation of International Preliminary Report on Patentability issued Aug. 9, 2011 in International (PCT) Application No. PCT/JP2010/072504, of which the present application is the national stage.

* cited by examiner

FIG. 2-A

```
Go to top
>X97070|X97070.1 L.cholodnii 16S rRNA gene.
         Length = 1521

Score = 2795 bits (1410), Expect = 0.0
 Identities = 1416/1418 (99%)
 Strand = Plus / Plus Query: 1    catgccttacacatgcaagtcgaacggtagaggagcaatcctcgagagtggcgaacgggt  60
            ||||||||||||||||||||||||||||||||||||||||||||||||||||||||||||
Sbjct: 37   catgccttacacatgcaagtcgaacggtagaggagcaatcctcgagagtggcgaacgggt  96

Query: 61   gagtaatgtatcggaacgtgcccagtagtggggggatagcccggcgaaagccggattaata  120
            ||||||||||||||||||||||||||||||||||||||||||||||||||||||||||||
Sbjct: 97   gagtaatgtatcggaacgtgcccagtagtggggggatagcccggcgaaagccggattaata  156

Query: 121  ccgcatgagacctgaggggtgaaagcggggggactcgcaaggggcctcgcgctactggagcgg  180
            ||||||||||||||||||||||||||||||||||||||| ||||||||||||||||||||
Sbjct: 157  ccgcatgagacctgaggggtgaaagcggggggactcgcaagagcctcgcgctactggagcgg  216

Query: 181  ccgatatcagattaggtagttggtgggtaaaagcctaccaagcctgcgatctgtagctg  240
            ||||||||||||||||||||||||||||||||||||||||||||||||||||||||||||
Sbjct: 217  ccgatatcagattaggtagttggtgggtaaaagcctaccaagcctgcgatctgtagctg  276

Query: 241  gtctgagaggacgaccagccacactgggactgagacacggcccagactcctacgggaggc  300
            ||||||||||||||||||||||||||||||||||||||||||||||||||||||||||||
Sbjct: 277  gtctgagaggacgaccagccacactgggactgagacacggcccagactcctacgggaggc  336

Query: 301  agcagtggggaattttggacaatgggcgaaagcctgatccagccatgccgcgtgcgggaa  360
            ||||||||||||||||||||||||||||||||||||||||||||||||||||||||||||
Sbjct: 337  agcagtggggaattttggacaatgggcgaaagcctgatccagccatgccgcgtgcgggaa  396

Query: 361  gaaggccttcgggttgtaaaccgcttttgtcagggaagaaatcctttgagttaatacctc  420
            ||||||||||||||||||||||||||||||||||||||||||||||||||||||||||||
Sbjct: 397  gaaggccttcgggttgtaaaccgcttttgtcagggaagaaatcctttgagttaatacctc  456

Query: 421  gggggatgacggtacctgaagaataagcaccggctaactacgtgccagcagccgcggta  480
            ||||||||||||||||||||||||||||||||||||||||||||||||||||||||||||
Sbjct: 457  gggggatgacggtacctgaagaataagcaccggctaactacgtgccagcagccgcggta  516

Query: 481  atacgtagggtgcaagcgttaatcggaattactgggcgtaaagcgtgcgcaggcggttgt  540
            ||||||||||||||||||||||||||||||||||||||||||||||||||||||||||||
Sbjct: 517  atacgtagggtgcaagcgttaatcggaattactgggcgtaaagcgtgcgcaggcggttgt  576

Query: 541  gtaagacagatgtgaaatccccgggctcaacctgggaactgcatttgtgactgcacagct  600
            ||||||||||||||||||||||||||||||||||||||||||||||||||||||||||||
Sbjct: 577  gtaagacagatgtgaaatccccgggctcaacctgggaactgcatttgtgactgcacagct  636

Query: 601  agagtacggtagaggggggatggaattccgcgtgtagcagtgaaatgcgtagatatgcgga  660
            ||||||||||||||||||||||||||||||||||||||||||||||||||||||||||||
Sbjct: 637  agagtacggtagaggggggatggaattccgcgtgtagcagtgaaatgcgtagatatgcgga  696
```

FIG. 2-B

```
Query:  661  ggaacaccgatggcgaaggcaatcccctggacctgtactgacgctcatgcacgaaagcgt  720
             ||||||||||||||||||||||||||||||||||||||||||||||||||||||||||||
Sbjct:  697  ggaacaccgatggcgaaggcaatcccctggacctgtactgacgctcatgcacgaaagcgt  756

Query:  721  ggggagcaaacaggattagataccctggtagtccacgccctaaacgatgtcaactggttg  780
             ||||||||||||||||||||||||||||||||||||||||||||||||||||||||||||
Sbjct:  757  ggggagcaaacaggattagataccctggtagtccacgccctaaacgatgtcaactggttg  816

Query:  781  ttgggagggtttcttctcagtaacgaagctaacgcgtgaagttgaccgcctggggagtac  840
             ||||||||||||||||||||||||||||||||||||||||||||||||||||||||||||
Sbjct:  817  ttgggagggtttcttctcagtaacgaagctaacgcgtgaagttgaccgcctggggagtac  876

Query:  841  ggccgcaaggttgaaactcaaaggaattgacgggaccccgcacaagcggtggatgatgtg  900
             ||||||||||||||||||||||||||||||||||||||||||||||||||||||||||||
Sbjct:  877  ggccgcaaggttgaaactcaaaggaattgacgggaccccgcacaagcggtggatgatgtg  936

Query:  901  gtttaattcgatgcaacgcgaaaaaccttacctacccttgacatgtcaagaatcttgcag  960
             ||||||||||||||||||||||||||||||||||||||||||||||||||||||||||||
Sbjct:  937  gtttaattcgatgcaacgcgaaaaaccttacctacccttgacatgtcaagaatcttgcag  996

Query:  961  agatgtgggagtgctcgaaagagaacttgaacacaggtgctgcatggccgtcgtcagctc  1020
             ||||||||||||||||||||||||||||||||||||||||||||||||||||||||||||
Sbjct:  997  agatgtgggagtgctcgaaagagaacttgaacacaggtgctgcatggccgtcgtcagctc  1056

Query: 1021  gtgtcgtgagatgttgggttaagtcccgcaacgagcgcaaccccttgtcattagttgctac  1080
             ||||||||||||||||||||||||||||||||||||||||||||||||||||||||||||
Sbjct: 1057  gtgtcgtgagatgttgggttaagtcccgcaacgagcgcaaccccttgtcattagttgctac  1116

Query: 1081  gaaagggcactctaatgagactgccggtgacaaaccggaggaaggtggggatgacgtcag  1140
             ||||||||||||||||||||||||||||||||||||||||||||||||||||||||||||
Sbjct: 1117  gaaagggcactctaatgagactgccggtgacaaaccggaggaaggtggggatgacgtcag  1176

Query: 1141  gtcctcatggcccttatgggtagggctacacacgtcatacaatggccggtacagagggca  1200
             ||||||||||||||||||||||||||||||||||||||||||||||||||||||||||||
Sbjct: 1177  gtcctcatggcccttatgggtagggctacacacgtcatacaatggccggtacagagggct  1236

Query: 1201  gccaacccgcgagggggagccaatcccagaaaaccggtcgtagtccggatcgcagtctgc  1260
             ||||||||||||||||||||||||||||||||||||||||||||||||||||||||||||
Sbjct: 1237  gccaacccgcgagggggagccaatcccagaaaaccggtcgtagtccggatcgcagtctgc  1296

Query: 1261  aactcgactgcgtgaagtcggaatcgctagtaatcgcggatcagcttgccgcggtgaata  1320
             ||||||||||||||||||||||||||||||||||||||||||||||||||||||||||||
Sbjct: 1297  aactcgactgcgtgaagtcggaatcgctagtaatcgcggatcagcttgccgcggtgaata  1356

Query: 1321  cgttcccgggtcttgtacacaccgcccgtcacaccatgggagcgggttctgccagaagta  1380
             ||||||||||||||||||||||||||||||||||||||||||||||||||||||||||||
Sbjct: 1357  cgttcccgggtcttgtacacaccgcccgtcacaccatgggagcgggttctgccagaagta  1416

Query: 1381  gttagcctaaccgcaaggagggcgattaccacggcagg  1418
             ||||||||||||||||||||||||||||||||||||||
Sbjct: 1417  gttagcctaaccgcaaggagggcgattaccacggcagg  1454
```

FIG. 3
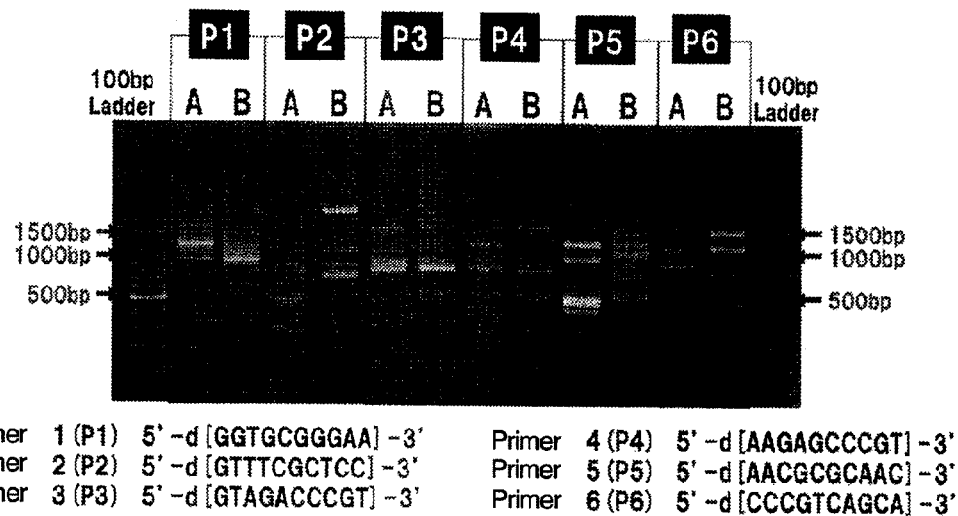
Primer 1 (P1) 5'-d[GGTGCGGGAA]-3'      Primer 4 (P4) 5'-d[AAGAGCCCGT]-3'
Primer 2 (P2) 5'-d[GTTTCGCTCC]-3'      Primer 5 (P5) 5'-d[AACGCGCAAC]-3'
Primer 3 (P3) 5'-d[GTAGACCCGT]-3'      Primer 6 (P6) 5'-d[CCCGTCAGCA]-3'
FIG. 4-A
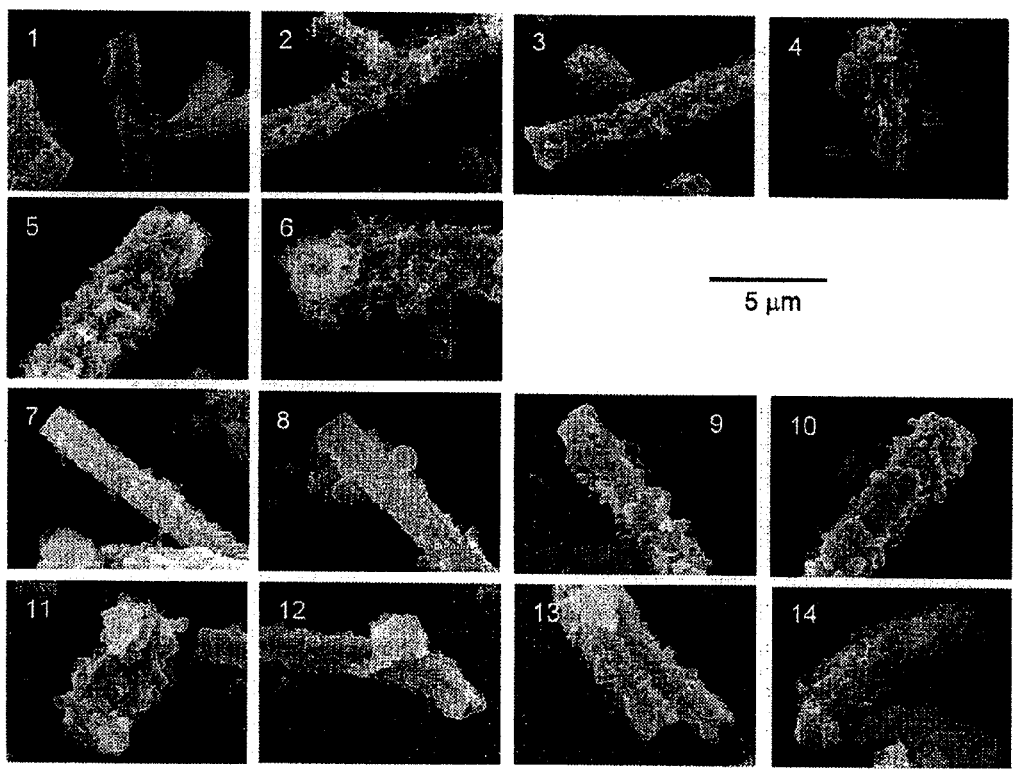

FIG. 4-B
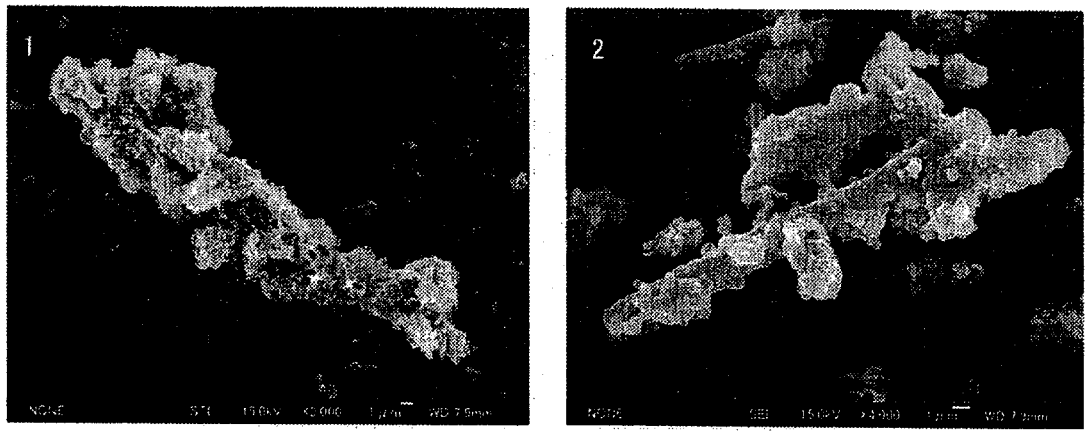
FIG. 5
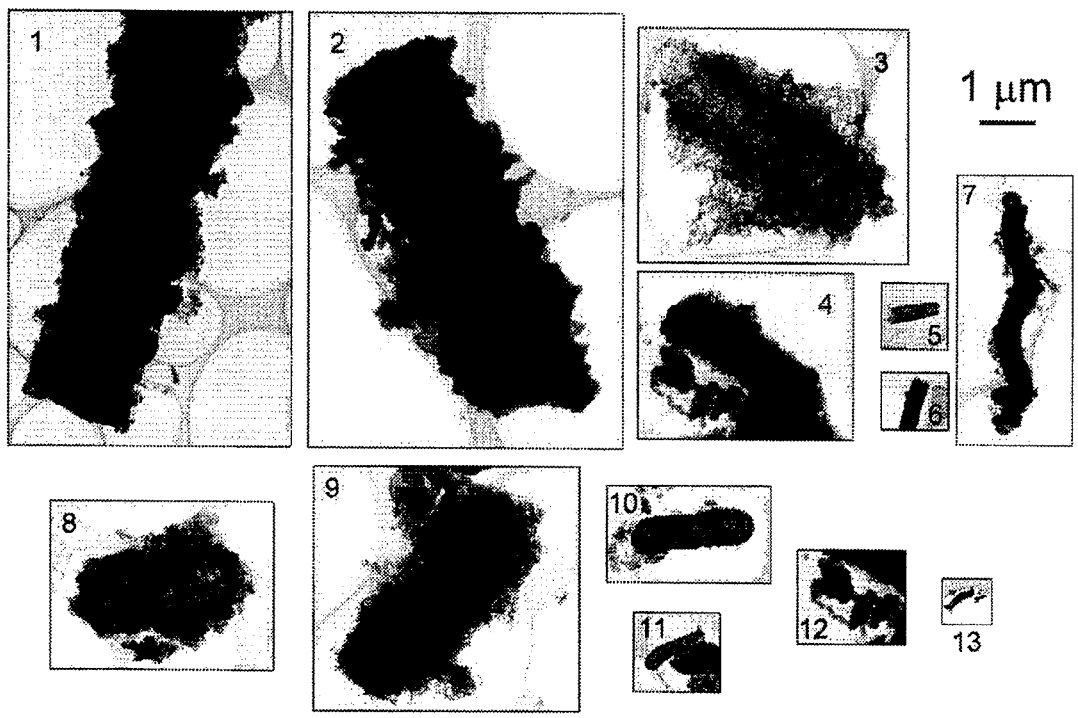

FIG. 18
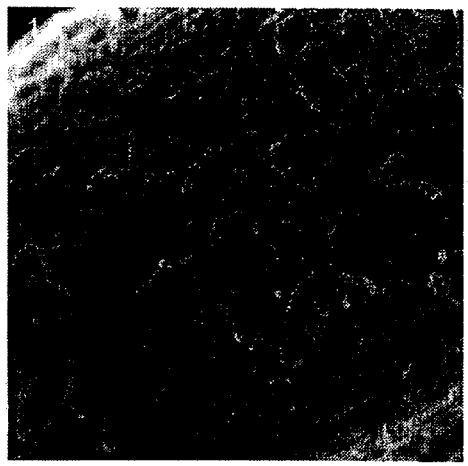
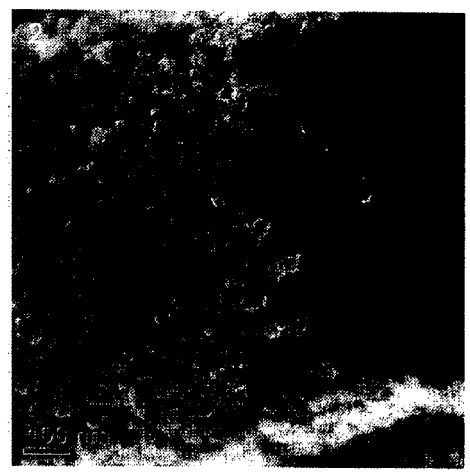
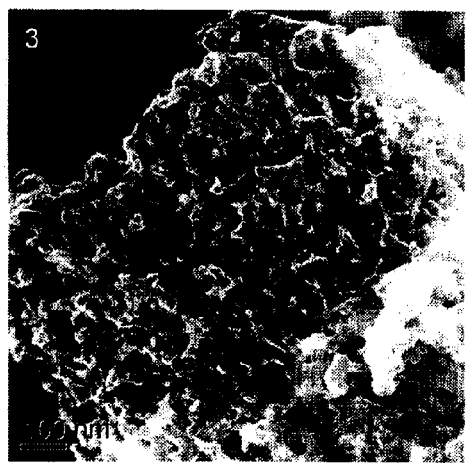
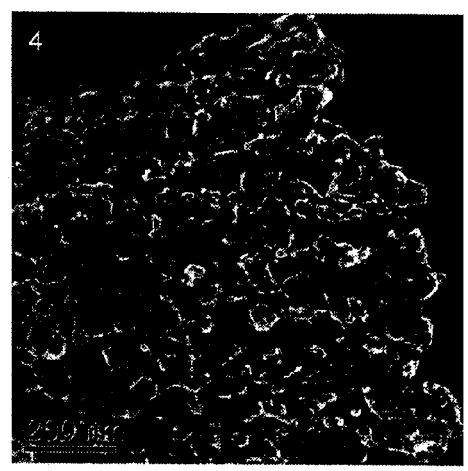

MAGNETIC CERAMIC AND PROCESS FOR PRODUCTION THEREOF

TECHNICAL FIELD

The present invention relates to a magnetic ceramic material and a process for producing the magnetic ceramic material.

BACKGROUND ART

Iron oxide is used in a wide range of fields, such as catalysts, magnetic materials, and pigments, and is a material of great industrial importance. Meanwhile, an iron atom is a substance of great importance in a catalytic reaction while also being a magnetic metal, and is known to have strong magnetization.

Some iron oxides also exhibit magnetism. Examples of typical magnetic iron oxides include needle-shaped $\gamma$-$Fe_2O_3$ used as a magnetic recording medium, such as cassette tapes and floppy disks (registered trademark); $Fe_3O_4$ used as toner for copiers; and the like (Non-Patent Literature (NPL) 1).

Since magnetic iron oxides have high biocompatibility, they are attracting attention as a carrier for use in biomedical technology, such as bioscreening, biosensors, anticancer hyperthermia, drug delivery systems, and MRI. As such, magnetic iron oxide is an attractive material that can be widely used in various fields, such as the ceramic industry, chemical industry, electronic industry, biotech industry, and medical field (NPL 2).

In addition, research is actively under way in terms of nanotechnology. Iron oxide with a very interesting shape, such as a nanotube, nanowire, nanorod, and nanoring, has been produced by controlling the form of the iron oxide at the nano level. Making use of such shapes and the iron oxide properties, there has been some research conducted aimed at applications to templates, microreactors, catalysts, magnetic materials, gas sensors, and the like (NPL 3 to 7).

Patent Literature (PTL) 1 discloses a nucleic acid extraction method comprising allowing nucleic acids to adsorb to amino groups formed on the surface of a particle. PTL 2 discloses that multi-layer dendorimers are formed on the surface of fine particles, amino radicals are formed on the surface of the dendorimers, and nucleic acid or protein is extracted or collected using these amino radicals. PTL 2 further discloses that fine particles of bacteria-derived magnetic bodies may be used as the fine particles and that the bacteria-derived magnetic body consists of a single-phase iron oxide with a size of 50 to 70 nm.

CITATION LIST

Patent Literature

PTL 1: Japanese Unexamined Patent Publication No. 2006-280277
PTL 2: Japanese Unexamined Patent Publication No. 2004-150797

Non-Patent Literature

NPL 1: Nanao Horiishi, Kinousei Sanka teppun to Sono Ouyou (Functional Iron Oxide Powder and Application Thereof), Yoneda Shuppan (2006)
NPL 2: M. Maeda, C. S. Kuroda, T. Shimura, M. Tada and M. Abe, J. Appl. Phys. 99 08H103 (2006)
NPL 3: C. J. Jia et al., Agew. Chem. Int. Ed. 44 (2005) 4328-4333
NPL 4: C. J. Jia et al., J. Am. Chem. Soc. 130, No. 50 (2008) 16968-16977
NPL 5: S. Zhan, D. Chen, X. Jiao and S. Liu, J. Colloid Interface Sci. 308 (2007) 265-270
NPL 6: Z. Liu et al., J. Am. Chem, Soc. 127 (2005) 6-7
NPL 7: S. Chen et al., Materials Letters 59 (2005) 985-988

SUMMARY OF INVENTION

Technical Problem

The bacteria-derived magnetic materials disclosed in PTL 1 and 2 are formed intracellularly and are in the form of nanoparticles consisting only of iron oxide. PTL 1 and 2 are silent about using, as the bacteria-derived magnetic material, a substance comprising a component other than iron oxide, or a substance that is formed extracellularly in a form other than a nanoparticle. Further, the bacteria that produce magnetic materials disclosed in PTL 1 and 2 show low productivity in producing magnetic materials and require a long time for cultivation.

In view of such prior art, the inventors considered that a novel magnetic iron oxide having further unique properties, shape, and the like, could be expected to find applications in novel uses of magnetic iron oxide, in addition to known uses thereof. A principal object of the present invention is to provide a novel magnetic ceramic material containing iron oxide, and a process for producing the magnetic ceramic material.

Solution to Problem

In view of the aforementioned prior art, the present inventors conducted extensive research. As a result, the present inventors found that heat treatment of a microorganism-derived iron atom-containing ceramic material obtained from nature can produce a magnetic ceramic material having unique properties. The inventors further found that a microorganism-derived iron atom-containing ceramic material obtained from nature also has various unique shapes, such as a sheath shape, and that an iron oxide-containing magnetic ceramic material obtained by heating such a microorganism-derived iron atom-containing ceramic material has a unique shape that is extremely difficult to artificially produce. The inventors conducted further research based on these findings, and accomplished the present invention. More specifically, the present invention provides a magnetic ceramic material and a process for producing the magnetic ceramic material as shown in Items 1 to 17 below.

Item 1. A magnetic ceramic material comprising, as main components,
(a) at least one magnetic iron oxide selected from the group consisting of $Fe_3O_4$ and $\gamma$-$Fe_2O_3$, and
(b) an amorphous phase.

Item 2. The magnetic ceramic material according to Item 1, wherein the magnetic iron oxide content is 40 to 60 mass, and the amorphous phase content is 60 to 40 mass.

Item 3. The magnetic ceramic material according to Item 1 or 2, wherein the amorphous phase contains oxides of iron, silicon, and phosphorus.

Item 4. The magnetic ceramic material according to Item 3, wherein the silicon oxide content is 10 to 30 mass % based on the mass of the magnetic ceramic material.

Item 5. The magnetic ceramic material according to Item 3 or 4, wherein the phosphorus oxide content is 5 to 20 mass % based on the mass of the magnetic ceramic material.

Item 6. The magnetic ceramic material according to any one of Items 1 to 5, wherein the surface is in the shape of a fine irregular structure.

Item 7. The magnetic ceramic material according to any one of Items 1 to 6, wherein the magnetic ceramic material contains an acidic hydroxyl group.

Item 8. The magnetic ceramic material according to Item 7, wherein acidic sites are observed from peaks of IR absorption at 1,640 cm$^{-a}$ and 1,544 cm$^{-1}$ attributable to pyridine adsorbed to the magnetic ceramic material.

Item 9. The magnetic ceramic material according to any one of Items 1 to 8, which is obtained by heating a microorganism-derived ceramic material containing an iron atom.

Item 10. The magnetic ceramic material according to any one of Items 1 to 9, which is in the shape of a sheath, a spiral, a branched tube, a thread, a short trunk, a capsule, a sphere, a microtube, a nanotube, a hollow string, a capsule, a string-and-sphere agglomerate, a string, or a rod.

Item 11. The magnetic ceramic material according to Item 9 or 10, wherein the microorganism is an iron bacterium.

Item 12. The magnetic ceramic material according to any one of Items 9 to 11, wherein the microorganism is *Leptothrix cholodnii* OUMS1 (NITE BP-860).

Item 13. A process for producing a magnetic ceramic material, comprising (1) heating a microorganism-derived iron oxide ceramic material containing an iron atom, and (2) reducing the iron oxide ceramic material obtained in Step (1) by heating in the presence of hydrogen gas.

Item 14. The process according to Item 13, further comprising (3) heating the magnetic ceramic material obtained in Step (2) in the presence of oxygen gas.

Item 15. The process according to Item 14, wherein the heating temperature in Step (3) is 100 to 300° C.

Item 16. The process according to any one of Items 13 to 15, wherein the heating temperature in Step (1) is 700 to 900° C.

Item 17. The process according to any one of Items 13 to 16, wherein the heating temperature in Step (2) is 400 to 650° C.

Advantageous Effects of Invention

According to the present invention, heat treatment of a variety of iron atom-containing ceramic materials obtained from nature can produce a novel magnetic ceramic material having properties and shapes that are extremely difficult to artificially produce. The magnetic ceramic material of the present invention contains magnetic iron oxide, and is therefore expected to be used in various fields, such as the ceramic industry, chemical industry, electronic industry, biotech industry, and medical field, where magnetic iron oxide is known to have been used.

Further, the magnetic ceramic material of the present invention is a composite material comprising an amorphous phase containing oxides of iron, silicon, and phosphorus, and ferrimagnetic iron oxide fine particles, such as $Fe_3O_4$ and $\gamma$-$Fe_2O_3$. Such a magnetic ceramic material is expected to find applications making use of not only the magnetism of the magnetic iron oxide but the properties of the amorphous phase. Specifically, the amorphous phase of oxides that contain iron and silicon is expected to find various applications, such as in adsorbents, catalysts, catalyst immobilization carriers, rubber reinforcing agents, and column fillers. Because the amorphous phase contains phosphorus, its use as a horticultural material, such as a fertilizer for crop cultivation, is also considered possible. Applications making use of the properties of both the magnetic iron oxide and the amorphous phase (for example, an application to a catalyst that can be magnetically separated) may also be considered as possible alternatives. Further, the magnetic ceramic material of the present invention optionally contains an acidic hydroxyl group, and its application to novel solid acid catalysts is thus also considered possible.

The magnetic ceramic material of the present invention has a unique shape that is produced by microorganisms, i.e., a sheath shape, which cannot be seen in known magnetic iron oxide. In addition, the magnetic ceramic material of the present invention has a unique nano-structure. The magnetic ceramic material of the present invention is therefore expected to find applications not only in templates, microreactors, catalysts, magnetic materials, gas sensors, and the like, but also in various items to which known magnetic iron oxides have not been applied.

BRIEF DESCRIPTION OF DRAWINGS

FIG. 2-A shows the results of a homology search showing the 16S ribosomal DNA nucleotide sequence of OUMS1 strain (upper row) and that of a known iron-oxidizing bacterium *Leptothrix cholodnii* SP-6 strain (lower row).

FIG. 2-B shows the results of a homology search showing the 16S ribosomal DNA nucleotide sequence of OUMS1 strain (upper row) and that of a known iron-oxidizing bacterium *Leptothrix cholodnii* SP-6 strain (lower row).

FIG. 3 compares the genomic DNA electrophoretic patterns of OUMS1 strain (A) and an iron-oxidizing bacterium *Leptothrix cholodnii* SP-6 strain (B).

FIG. 4-A shows SEM images of an iron oxide formed by OUMS1 strain.

FIG. 4-B shows SEM images of an iron oxide formed by OUMS1 strain.

FIG. 5 shows TEM images of an iron oxide formed by OUMS1 strain.

FIG. 18 shows ultra-high resolution SEM images of the untreated sample 1, the sample 2 obtained by procedure (I) of Example 1, the sample 3 obtained by procedures (I) and (II) of Example 1, and the sample 4 obtained by procedures (I) to (III) of Example 1.

DESCRIPTION OF EMBODIMENTS

Figure 1:
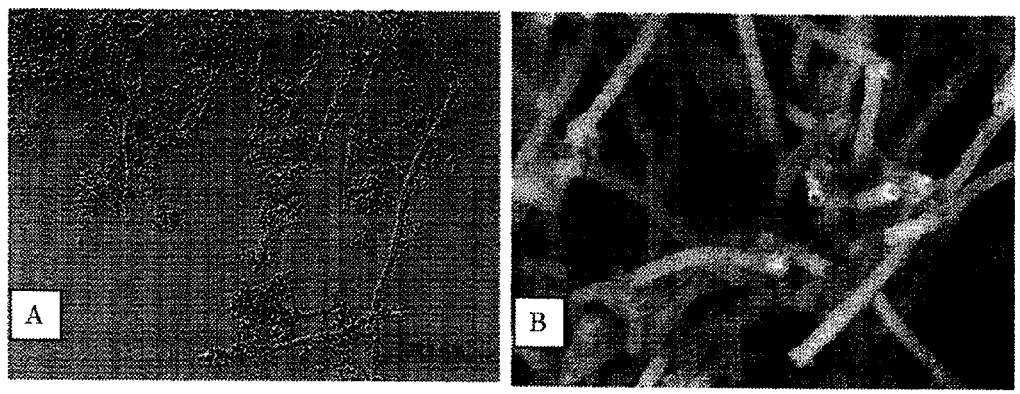
FIG. 1 shows an optical microscope image (A) and a scanning electron microscope (SEM) image (B) of an oxide in the shape of a sheath obtained after culturing an OUMS1 strain in a JOP liquid medium.

One of the features of the magnetic ceramic material of the present invention is that it comprises, as main components, (a) at least one magnetic iron oxide selected from the group consisting of $Fe_3O_4$ and $\gamma\text{-}Fe_2O_3$, and (b) an amorphous phase. The magnetic ceramic material of the present invention having such unique properties can be obtained by heating a microorganism-derived ceramic material containing an iron atom.

Microorganism-Derived Ceramic Material Containing an Iron Atom

The microorganism-derived ceramic material containing an iron atom, which serves as a starting material for the magnetic ceramic material of the present invention, is an inorganic substance (ceramic material) extracellularly produced by various bacteria, and is known to have a variety of shapes.

Examples of microorganisms that extracellularly produce ceramic materials containing an iron atom include iron bacteria. Habitats for iron bacteria are, for example, rivers, ponds, the ground, and paddy fields. Iron bacteria produce ceramic materials of various shapes, such as sheath, spiral, bar, and grain shapes.

Examples of iron bacteria that can be used in the present invention include bacteria that belong to the genus *Leptothrix, Gallionella, Sphaerotilus, Clonothrix, Toxothrix, Sideromonas, Siderocapsa*, and *Siderococcus* (see, for example, edited by Sadao Kojima, Ryuichi Sudo, and Mitsuo Chihara: "Environmental Microorganism Pictorial Book," Kodansha, Ltd., (1995)).

For example, *Leptothrix ochracea*, which is a representative iron bacterium, is known to produce a sheath-shaped ceramic material containing an iron atom (for example, "H. Hashimoto, S. Yokoyama, H. Asaoka, Y. Kusano, Y. Ikeda, M. Seno, J. Takada, T. Fujii, M. Nakanishi, R. Murakami, Characteristics of hollow microtubes consisting of amorphous ironoxide nanoparticles produced by ironoxidizing bacteria, *Leptothrix ochracea*. J. Magn. Magn. Mater., 310, 2405-2407 (2007)").

The ceramic material produced by *Leptothrix ochracea* is a sheath-shaped substance with a diameter of about 1 μm and a length of about 200 μm, and is an oxide that contains, in addition to iron and oxygen, trace amounts of silicon and phosphorus. Moreover, the sheath-shaped structure is composed of nanoparticles with a diameter of 100 nm or less (about 10 to 40 nm). The kinds and ratio of the components, such as iron, silicon, and phosphorus, contained in ceramics produced by the same kind of microorganism vary according to the environment of the microorganism.

The sheath-shaped ceramic material produced by *Leptothrix ochracea* is present, for example, in the sediment precipitated in a gravity filtration facility of a water purification plant. The *Leptothrix ochracea*-derived ceramic material can be purified by subjecting the sediment to centrifugation, drying under reduced pressure, etc.

In addition to *Leptothrix ochracea*, which produces a sheath-shaped ceramic material, for example, *Gallionella* is known to produce a spiral ceramic material; *Sphaerotiius* and *Clonothrix* are known to produce a branched tubular or thread-shaped ceramic material; *Toxothrix* is known to produce a thread-shaped (harp-like-shaped, pie-wedge-shaped) ceramic material; *Sideromonas* is known to produce a short trunk-shaped ceramic material; *Siderocapsa* is known to produce a capsule-shaped ceramic material; and *Siderococcus* is known to produce a spherical ceramic material (see, for example, edited by Sadao Kojima, Ryuichi Sudo, and Mitsuo Chihara "Environmental Microorganism Pictorial Book," Kodansha, Ltd. (1995)). These ceramic materials can be isolated, purified, and analyzed by the same methods as those for ceramic materials produced by *Leptothrix ochracea*.

In the present invention, ceramic materials derived from bacteria that are capable of producing iron oxide having a low-crystalline iron oxide ferrihydrite or lepidocrocite structure can be used as microorganism-derived ceramic materials containing an iron atom.

Ferrihydrite as used herein refers to a low-crystalline iron oxide. Ferrihydrite is called 2-line ferrihydrite, 6-line ferrihydrite, etc., depending on the number of peaks that appear in X-ray diffraction patterns thereof. The composition of 2-line ferrihydrite is $Fe_4(O, OH, H_2O)$, and the composition of 6-line ferrihydrite is $Fe_{4.6}(O, OH, H_2O)_{12}$ (R. A. Eggleton and R. W. Fitzpatrick, "New data and a revised structural model for ferrihydrite," Clays and Clay Minerals, Vol. 36, No. 2, pages 111 to 124, 1988).

Lepidocrocite is a crystalline iron oxide represented by the chemical formula of $\gamma$-FeOOH and having the following properties. Crystal system: orthorhombic system, space group: Bb mm, lattice constant: a=0.3071, b=1.2520, c=0.3873 Å, and $\alpha=\beta=\gamma=90°$.

The iron oxide produced by iron oxide-producing bacteria may contain phosphorus and silicon. The primary particle diameter of ferrihydrite nanoparticles is preferably about 3 to 5 nm, and the primary particle diameter of lepidocrocite nanoparticles is preferably about 30 to 50 nm.

Although any bacterium that is capable of producing iron oxide having a ferrihydrite or lepidocrocite structure may be used, the microorganism preferably belongs to the genus *Leptothrix*. One example of such a microorganism is a *Leptothrix cholodnii* OUMS1 strain isolated from a water purification plant. The *Leptothrix cholodnii* OUMS1 strain can produce iron oxide having a ferrihydrite or lepidocrocite structure. Mycological and genetic properties of the *Leptothrix cholodnii* OUMS1 strain are shown below.

(i) Mycological Properties

The *Leptothrix cholodnii* OUMS1 strain is a bacillus with a length of several micrometers and a width of about 1 micrometer. At the single-cell stage, this strain actively moves using a flagellum. As the cell grows, both ends of the cell are connected, and a fibrous material comprising a polysaccharide and a protein is formed around the cell. As a result, this cell cannot be uniformly present in a liquid medium and is in an aggregated and precipitated state. When iron and manganese are added to the medium, iron oxide and manganese oxide adhere to the fibrous material that is present outside of the cell, thus forming a sheath-shaped structure. The cell forms a white amorphous fibrous colony on an agar medium. When iron is added, the colony becomes yellowish brown. When manganese is added, the colony becomes brown.

(ii) Genetic Properties

The nucleotide sequence of the 16S rDNA of the *Leptothrix cholodnii* OUMS1 strain is shown in SEQ ID NO: 1 of the Sequence Listing. A BLAST search was performed on the DDBJ database for the nucleotide sequence of 16S rDNA. The results of this search and the mycological properties described above confirmed that this cell belongs to *Leptothrix cholodnii*.

The *Leptothrix cholodnii* OUMS1 strain was deposited as Accession No. NITE P-860 in the National Institute of Technology and Evaluation, Patent Microorganisms Depositary (Kazusa Kamatari 2-5-8, Kisarazu, Chiba, 292-0818, Japan) on Dec. 25, 2009. This bacterial strain has been transferred to an international deposit under Accession No. NITE BP-860.

In addition to the *Leptothrix cholodnii* OUMS1 strain, other examples of microorganisms belonging to the genus *Leptothrix* that are capable of producing iron oxide having a ferrihydrite or lepidocrocite structure include microorganisms belonging to the genus *Leptothrix* having 16S rDNA consisting of the nucleotide sequence shown in SEQ ID NO: 1. Specific examples of bacteria that are capable of producing iron oxide having a ferrihydrite or lepidocrocite structure include bacteria having 16S rDNA consisting of the nucleotide sequence shown in SEQ ID NO: 1.

The ceramic material derived from microorganisms belonging to the genus *Leptothrix* or from bacteria that are capable of producing iron oxide may be in the shape of a microtube, a nanotube, a hollow string, a capsule, a string-and-sphere agglomerate, a string, a rod, or the like.

Microorganism-derived ceramic materials containing an iron atom are known to have various structures as described above. The size of the microorganism-derived ceramic material containing an iron atom as used herein varies depending on the kind of material, and is typically about 0.1 to 3,000 µm.

More specifically, for example, a ceramic material in the shape of a sheath, a spiral, a branched tube, a thread, or a short trunk typically has a diameter of about 0.1 to 5 µm and a length of about 5 to 3,000 µm. A capsule-shaped ceramic material typically has a length of about 1.2 to 24 µm. A spherical ceramic material has a diameter of about 0.1 to 1 µm. A microtubular ceramic material has a diameter of about 0.3 to 4 µm, and a length of about 5 to 200 µm. A nanotubular ceramic material has a diameter of about 300 to 450 nm and a length of about 5 to 200 µm. A hollow string-shaped ceramic material has a length of about 3 to 10 µm. A capsule-shaped ceramic material has a major axis of about 1.5 to 7 µm and a minor axis of about 0.5 to 3 µm. A thread-shaped ceramic material has a length of about 0.5 to 5 µm. A rod-shaped ceramic material has a length of about 5 to 30 µm.

A microorganism-derived ceramic material containing an iron atom preferably contains silicon, phosphorus, etc., in addition to an iron atom. A microorganism-derived ceramic containing an iron atom typically contains an oxygen atom, a carbon atom, and a hydrogen atom.

For example, by culturing the above-described microorganism in an environment where a transition metal element such as cobalt, nickel, or manganese, a rare earth element such as neodymium, and the like are present, the resulting microorganism-derived ceramic material can contain these elements. When the ceramic material contains these elements, the magnetic ceramic material of the present invention can have magnetism derived from substances other than iron. The ceramic material may further contain light elements, such as sodium, magnesium, and aluminum.

A ceramic material derived from microorganisms belonging to the genus *Leptothrix* or from iron oxide-producing bacteria has, for example, a ferrihydrite or lepidocrocite structure and a fibrous or scaly surface.

The surface refers to the outer surface of the tube. The term "fibrous" refers to the state of a surface where thread-shaped materials are complicatedly tangled with each other. The term "scaly" refers to a surface that is covered with scaly substances.

The components include, for example, Fe, O, Si, and P. The iron oxide typically further includes a carbon atom and a hydrogen atom. It is usually preferable that the element ratio of iron, silicon, and phosphorus is approximately 66-87:2-27:1-32 by atomic % (at %). The ceramic materials may be an aggregate of ferrihydrite nanoparticles with a primary particle diameter of about 3 to 5 nm or an aggregate of lepidocrocite with a primary particle diameter of about 30 to 50 nm.

Heat Treatment

The magnetic ceramic material of the present invention is obtained by subjecting a microorganism-derived ceramic material containing an iron atom to heat treatment. The heat-treatment conditions are not particularly limited, insofar as the iron atom contained in the microorganism-derived ceramic material is reduced and oxidized to a magnetic iron oxide (for example, $Fe_3O_4$ and $\gamma\text{-}Fe_2O_3$). The heat treatment of the present invention includes heating accompanied by oxidation, heating accompanied by reduction, and heating not accompanied by oxidation or reduction. The heat treatment may be carried out, for example, by an oxidation method comprising heating at 700 to 900° C. in the presence of an oxygen gas (for example, atmospheric air), a hydrogen reduction method comprising heating at about 400 to 650° C. in the presence of hydrogen gas, or a method of mixing a starting material ceramic material with an aqueous alkali solution containing $Fe^{2+}$ ion prepared by replacement with $N_2$ gas and heating the resulting mixture under reflux (see, for example, "S. A. Kahani and M. Jafari, J. Magn. Magn. Mater., 321 (2009) 1951-1954", etc.).

A preferable method (heat treatment) for producing the magnetic ceramic material of the present invention is, for example, a method comprising the following Steps (1) and (2):

(1) heating the microorganism-derived iron oxide ceramic material containing an iron atom; and (2) reducing the iron oxide ceramic material obtained in Step (1) by heating in the presence of hydrogen gas.

The heat treatment comprising the above Steps (1) and (2) produces a magnetic ceramic material mainly containing $Fe_3O_4$.

Another example of a preferable method (heat treatment) for producing the magnetic ceramic material of the present invention is a method comprising the following Step (3) in addition to the heat treatment comprising the above Steps (1) and (2):

(3) heating the magnetic ceramic material obtained in Step (2) in the presence of oxygen gas (an oxidation-annealing step).

The heat treatment comprising the above Steps (1) to (3) produces a magnetic ceramic material mainly containing $\gamma$-$Fe_2O_3$.

The heating temperature in Step (1) is preferably about 700 to 900° C., more preferably about 750 to 850° C., and particularly preferably about 800° C. Further, the heat treatment in Step (1) can be carried out, for example, in an atmosphere in the presence of an oxygen gas (for example, atmospheric air). The heating time is typically about 0.1 to 12 hours, preferably about 1 to 4 hours, and more preferably about 2 hours.

The heating temperature in Step (2) is preferably about 400 to 650° C., more preferably 450 to 600° C., and particularly preferably about 550° C. The heating reduction time in Step (2) is typically about 1 to 5 hours, preferably 2 to 4 hours, and more preferably about 3 hours. Step (2) may be carried out in the presence of hydrogen gas, and preferably in a mixed gas of hydrogen gas with an inert gas, such as nitrogen or argon. When such a mixed gas is used, the molar ratio of the inert gas to hydrogen gas may be typically in the range of about 0:100 to 99:1, preferably about 75:25 to 97:3, and more preferably about 97:3. The pressure of the mixed gas may be about 0.1 MPa.

The heating temperature in Step (3) is preferably about 100 to 300° C., more preferably 150 to 250° C., and particularly preferably about 250° C. The heating time in Step (3) is typically about 0.1 to 12 hours, preferably about 1 to 4 hours, and more preferably about 2 hours. Step (3) can be carried out in an atmosphere in the presence of oxygen gas, for example, in atmospheric air.

The heating step in Step (1) may be carried out by heating a starting microorganism-derived iron oxide ceramic material as mentioned above by using an electric furnace or the like. Prior to Step (1), the microorganism-derived iron oxide ceramic material obtained from nature may be dried. The drying method is not particularly limited and may be a known method, such as vacuum drying, drying by heating (about 100° C.), and lyophilization. The heating reduction step in Step (2) may be carried out by heating the iron oxide ceramic material obtained in Step (1) in the presence of hydrogen gas in an electric furnace. For example, an electric furnace for hydrogen reduction may be used to perform the heating step in Step (2). As a commercially available electric furnace for hydrogen reduction, for example, a tubular furnace produced by Koyo Lindberg Ltd. can be used. An electric furnace as used in Step (1) or the like can be used as a heating means in Step (3).

When the magnetic ceramic material of the present invention is subjected to heat treatment, at least part of the iron atoms contained in the microorganism-derived iron oxide ceramic material are converted to a structure such as $Fe_3O_4$ or $\gamma$-$Fe_2O_3$, which has ferrimagnetism. In the heating (firing) step in Step (1), the microorganism-derived iron oxide ceramic material produces $\alpha$-$Fe_2O_3$. $\alpha$-$Fe_2O_3$ (hematite) does not have magnetism, unlike $\gamma$-$Fe_2O_3$ (magnetite) and $Fe_3O_4$ (maghemite). $\alpha$-$Fe_2O_3$ obtained in Step (1) is subjected to heating reduction in Step (2) to convert $\alpha$-$Fe_2O_3$ to $Fe_3O_4$. Further, $Fe_3O_4$ is subjected to an oxidation treatment in Step (3) to convert $Fe_3O_4$ to $\gamma$-$Fe_2O_3$.

The heating reduction in Step (2) is preferably carried out in a hydrogen gas atmosphere from which oxygen has been removed. The method for removing oxygen from a mixed gas containing hydrogen gas may be, for example, passage through an oxygen removal column. The oxygen removal column may be a commercially available product. For example, a Large Oxy-Trap produced by GL Sciences Inc. can be used.

Water is generated during the heating reduction in the presence of hydrogen gas in Step (2). The heating reduction step is preferably carried out in an atmosphere from which water has been removed. The method for removing water from the mixed gas containing hydrogen gas may be, for example, positioning a desiccant (for example, $P_2O_5$) before and after the sample in the heating means of Step (2) to thereby perform a hydrogen reduction step while passing a hydrogen gas-containing mixed gas from which water has been removed.

Removal of trace amounts of oxygen in the hydrogen reduction gas and water generated by the reduction reaction by using methods as mentioned above can prevent surface oxidation that would otherwise occur upon cooling the ceramic material, and can convert iron oxide contained in the magnetic ceramic material into a single phase of $Fe_3O_4$ (according to X-ray diffraction (XRD) analysis; the same applies hereinafter).

The magnetic ceramic material of the present invention can be produced by a method comprising Steps (1) and (2), or a method comprising Steps (1) to (3).

Magnetic Ceramic Material

The magnetic ceramic material of the present invention that has been subjected to the above heat treatment contains iron oxide. The magnetic ceramic material of the present invention has magnetism because at least one kind of iron oxide contained therein has magnetism. The magnetic ceramic material of the present invention contains at least one magnetic iron oxide selected from the group consisting of $Fe_3O_4$ and $\gamma$-$Fe_2O_3$.

The shape of the magnetic ceramic material of the present invention is generally similar to the shape of the microorganism-derived ceramic material used as the starting material. More specifically, the magnetic ceramic material of the present invention may be in the shape of a sheath, a spiral, a branched tube, a thread (including a thread aggregate such as a harp-like or a pie wedge), a short trunk, a capsule, a sphere, a microtube, a nanotube, a hollow string, a capsule, a string-and-sphere agglomerate, a string, or a rod. The size of the magnetic ceramic material of the present invention is typically about 0.1 to 3,000 µm.

More specifically, for example, the ceramic material in the shape of a sheath, a spiral, a branched tube, a thread, or a short trunk typically has a diameter of about 0.1 to 5 µm and a length of about 5 to 3,000 µm, preferably a diameter of about 0.3 to 3 µm and a length of about 5 to 1,000 µm, and more preferably a diameter of about 0.5 to 2 µm and a length of 5 to 200 µm. The ceramic material in the shape of a capsule typically has a length of about 1.2 to 24 µm. Further, the spherical ceramic material has a diameter of about 0.1 to 1 µm. The microtubular ceramic material has a diameter of about 0.3 to 4 µm and a length of about 5 to 200 µm. The nanotubular ceramic material has a diameter of about 300 to 450 nm and a length of about 5 to 200 µm. The ceramic material in the shape of a hollow string has a length of about 3 to 10 µm. The ceramic material in the shape of a capsule has a major axis of about 1.5 to 7 µm and a minor axis of about 0.5 to 3 µm. The ceramic material in the form of a string has a length of about 0.5 to 5 µm. The ceramic material in the shape of a rod has a length of about 5 to 30 µm.

Whether the magnetic ceramic material of the present invention contains $Fe_3O_4$ or $\gamma$-$Fe_2O_3$ makes little difference in surface shape. The magnetic ceramic material of the present invention preferably has a fine irregular structure on its surface as observed in an ultra-high resolution SEM image (See FIG. 18).

In the magnetic ceramic material of the present invention, when the microorganism-derived ceramic material contains silicon and phosphorus in addition to an iron atom, the ratio of the components is similar to that in the microorganism-derived ceramic material used as the starting material. More specifically, when the magnetic ceramic material of the present invention contains iron, silicon, and phosphorus, the element ratio of iron, silicon, and phosphorus by atomic % (at %) is typically about 66-87:2-27:1-32, and preferably 70-77: 16-27:1-9.

The components of the magnetic ceramic material of the present invention vary according to the components of the microorganism-derived ceramic material used as the starting material. As described above, for example, when the microorganism that produces the ceramic material is cultured in an environment in the presence of a transition metal element, such as cobalt, nickel, or manganese, a rare earth element, such as neodymium, and the like, the resulting microorganism-derived ceramic material can contain these elements. The magnetic ceramic material of the present invention containing these elements can have magnetism derived from substances other than iron. The ceramic material may further contain a light element, such as sodium, magnesium, and aluminum.

When the magnetic ceramic material of the present invention contains silicon and phosphorus in addition to iron, $Fe_3O_4$ and $\gamma$-$Fe_2O_3$ contained in the magnetic ceramic material and silicon and phosphorus in the form of solids are not typically dissolved, and iron, silicon, and phosphorus are phase-separated from each other. When the magnetic ceramic material of the present invention contains silicon and phosphorus, the X-ray diffraction (XRD) pattern of the magnetic ceramic material shows no clear peaks attributable to silicon or phosphorus. Thus, silicon and phosphorus are considered to be in the form of an oxide of an amorphous structure. The amorphous phase of the magnetic ceramic material of the present invention preferably contains amorphous silica as its main component.

The crystallite size of the magnetic ceramic material of the present invention is, for example, about 5 to 100 nm.

Further, when iron oxide contained in the magnetic ceramic material of the present invention is a single phase of $Fe_3O_4$, about 60% of the iron contained in the magnetic ceramic material is $Fe_3O_4$, and about 40% thereof is paramagnetic $Fe^{2+}$ and $Fe^{3+}$. In contrast, when iron oxide contained in the magnetic ceramic material of the present invention is a single phase of $\gamma$-$Fe_2O_3$, about 70% of the iron contained in the magnetic ceramic material is $\gamma$-$Fe_2O_3$, and about 30% thereof is paramagnetic $Fe^{2+}$ and $Fe^{3+}$.

As described in the Examples below, the composition of the amorphous phase can be calculated from the results of Mössbauer spectroscopy and the ratio of iron, silicon, and phosphorus in the microorganism-derived ceramic material used as the starting material, assuming that paramagnetic $Fe^{2+}$ and $Fe^{3+}$ are Fe components that constitute the amorphous phase. When the ratio of iron, silicon, and phosphorus in the microorganism-derived ceramic material is Fe:Si: P=66-87:2-27:1-32 as mentioned above and when iron oxide contained in the magnetic ceramic material of the present invention is a single phase of $Fe_3O_4$, the composition (at %) of the amorphous phase has a Fe:Si:P ratio of approximately 36-66:5-55:2-60. When iron oxide contained in the magnetic ceramic material of the present invention is a single phase of $\gamma$-$Fe_2O_3$, the composition (at %) of the amorphous phase has a Fe:Si:P ratio of approximately 39-69:4-51:2-56.

When the magnetic ceramic material of the present invention contains $Fe_3O_4$, the magnetic ceramic material has a saturation magnetization of typically about 1 to 50 emu/g, preferably about 30 to 50 emu/g, and more preferably about 40 to 50 emu/g. The magnetic ceramic material typically has a coercivity of about 0 to 250 Oe. Moreover, the magnetic ceramic material has a residual magnetization of about 0 to 20 emu/g. When iron oxide contained in the magnetic ceramic material of the present invention is a single phase of $Fe_3O_4$, the magnetic ceramic material typically has a saturation magnetization of about 50 emu/g.

When iron oxide contained in the magnetic ceramic material of the present invention contains $\gamma$-$Fe_2O_3$, the magnetic ceramic material has a saturation magnetization of typically about 1 to 40 emu/g, preferably about 25 to 40 emu/g, and more preferably about 30 to 40 emu/g. The magnetic ceramic material typically has a coercivity of about 0 to 60 Oe. The magnetic ceramic material has a residual magnetization of about 0 to 20 emu/g. When iron oxide contained in the magnetic ceramic material of the present invention is a single phase of $\gamma$-$Fe_2O_3$, the magnetic ceramic material typically has a saturation magnetization of about 40 emu/g.

Pure $Fe_3O_4$ and $\gamma$-$Fe_2O_3$ have a saturation magnetization of 98 emu/g and 81 emu/g, respectively. In view of this, the magnetic ceramic material of the present invention contains magnetic iron oxide fine particles of $Fe_3O_4$ or $\gamma$-$Fe_2O_3$ in an amount of about 1 to 50 mass %.

The amount of the at least one magnetic iron oxide selected from the group consisting of $Fe_3O_4$ and $\gamma$-$Fe_2O_3$ contained in the magnetic ceramic material of the present invention is preferably about 30 to 50 mass %, and more preferably about 40 to 50 mass %. The amount of the amorphous phase contained in the magnetic ceramic material of the present invention is preferably about 70 to 50 mass %, and more preferably about 60 to 50 mass %.

When the magnetic ceramic material of the present invention contains oxides of silicon and phosphorus, the content of the silicon oxide in the magnetic ceramic material is preferably about 10 to 30 mass %, and more preferably about 15 to 25 mass %, and the content of the phosphorus oxide in the magnetic ceramic material is preferably 1 to 20 mass %, and more preferably 1 to 10 mass %.

The magnetic ceramic material of the present invention preferably contains an acidic hydroxyl group. The acidic sites due to the presence of the hydroxyl group can be observed from the peaks of the IR absorption spectra at 1,640 cm$^{-1}$ and 1,544 cm$^{-1}$ when pyridine is allowed to adsorb to the magnetic ceramic material. Due to the existence of such an acidic hydroxyl group, the magnetic ceramic material of the present invention can be used as a solid acid catalyst.

EXAMPLES

Hereinafter, the present invention is described in further detail with reference to Examples, etc. However, the present invention is not limited to these Examples.
1. Isolation and Purification of Microorganism-Derived Ceramic Material Containing Iron (a)

A turbid liquid containing microorganism-derived ceramic material containing iron (a sheath-shaped ceramic material produced by *Leptothrix ochracea*) was collected from a water purification plant in Joyo City, Kyoto, placed in a 20-L tank, and allowed to stand to precipitate the ceramic material. Then, 10 L of the supernatant was removed by decantation. The turbid liquid was placed in a centrifuge tube (size: 50 mL), and an ultrasonic wave was applied thereto for several minutes. Thereafter, the ceramic material was precipitated by centrifugation (3,000 rpm, 5 minutes), and the supernatant was removed. Then, the precipitate was collected and transferred to another centrifuge tube so as not to mix the sand accumulated at the bottom of the centrifuge tube. Distilled water was then added thereto and suspended, and centrifugation (3,000 rpm, 5 minutes) was performed again. This procedure was repeated about 5 times. This procedure removed initial impurities, i.e., the sand and impurity ions in the groundwater. The precipitate was transferred to a petri dish and vacuum dried using a diaphragm vacuum pump. Thereby, a *Leptothrix ochracea*-derived ceramic material (a reddish brown powder) was obtained. According to the determination of an energy dispersive X-ray spectrometer (EDX), the elemental ratio of Fe:Si:P in the ceramic material was 73:22:5. For characterization of microorganism-derived ceramic material, a method disclosed in the aforementioned reference, H. Hashimoto, S. Yokoyama, H. Asaoka, Y. Kusano, Y. Ikeda, M. Seno, J. Takada, T. Fujii, M. Nakanishi, R. Murakami, Characteristics of hollow microtubes consisting of amorphous ironoxide nanoparticles produced by ironoxidizing bacteria, *Leptothrix ochracea*. J. Magn. Magn. Mater., 310, 2,405-2,407 (2007), can be employed.

2. Isolation and Purification of Microorganism-Derived Ceramic Material (B)

Figure 16:
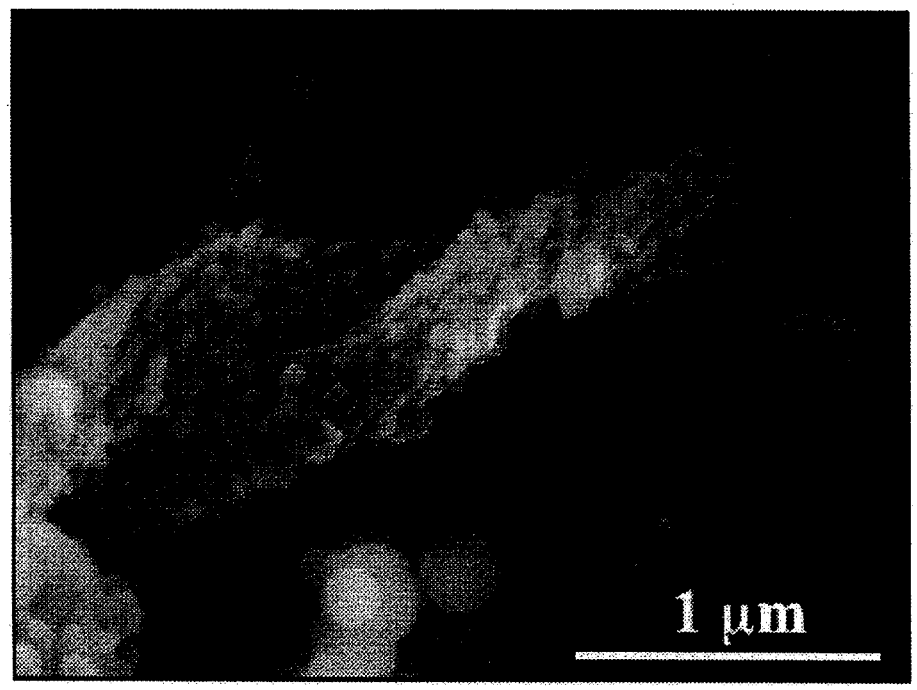
FIG. 16 shows an SEM photograph of *Gallionella ferruginea*-derived ceramic material in the shape of a spiral obtained in the isolation and purification of microorganism-derived ceramic material (B).

In a manner similar to the above, ceramic materials were isolated from sludge collected from a gutter at the main building of the Faculty of Engineering of Okayama University. It was confirmed that the sludge mainly contained a *Gallionella ferruginea*-derived ceramic material in the shape of a spiral. FIG. 16 shows an SEM photograph thereof.

According to the determination of EDX, the elemental ratio of Fe:Si:P in the obtained ceramic material was 77:18:5.

3. Isolation and Purification of Microorganism-Derived Ceramic Material Containing Iron (C)

(1) Isolation of OUMS1 Strain from Water Purification Plant in Joyo City, Kyoto

Water was collected from groundwater sediment contained in an iron bacteria tank in the Joyo City Cultural Center in Joyo City, Kyoto, and placed in a container. A small amount thereof (e.g., 0.5 to 1 g) was introduced into a GP liquid medium (containing 0.076 g of disodium hydrogenphosphate dodecahydrate, 0.02 g of potassium dihydrogenphosphate dihydrate, 2.383 g of HEPES, and 0.01 mM of iron sulfate, per liter of sterile groundwater, whose pH was adjusted to 7.0 with an aqueous sodium hydroxide solution) containing an iron fragment (purity: 99.9%, about 5 mm square), and sufficiently suspended. Thereafter, the resulting product was cultured at 20° C. for 10 days in a shaking incubator (70 rpm). A portion of the sediment that increased during the culture was collected, transferred to a flask containing a fresh GP liquid medium containing an iron fragment, and subjected to shaking culture for another 10 days under the same conditions. This process was repeated once again. A small amount of the liquid in the flask was collected and diluted with a GP liquid medium to $10^{-2}$ to $10^{-6}$. Each diluted solution was separately added dropwise to a respective GP agar plate medium in a sterile Petri dish and spread-plated onto each of the media with a sterile glass rod. When the media were cultured at 20° C. for 7 to 10 days in an incubator, the proliferation of the target bacteria and the formation of a sheath-shaped oxide were observed.

After the completion of the culture, the obtained single colony (strain) was individually picked up with a sterilized toothpick, inoculated into newly prepared GP agar plate media, and cultured at 20° C. for 10 days. Colonies then appeared on the media. Among these colonies, an irregularly shaped colony of a light yellowish brown color was identified. Observation with a low-power optical microscope confirmed that the majority of the moiety of a light yellowish brown color was in the sheath structure. The isolated strain having such properties was designated as an OUMS1 strain.

A portion of the identified OUMS1 strain colony was scraped, transferred to a flask containing a newly prepared GP liquid medium, and cultured at 20° C. for 10 days in a shaking incubator (70 rpm). Thereafter, the increased suspended material was placed on a slide glass and observed with an optical microscope and a scanning electron microscope. The formation of a sheath-shaped oxide was confirmed (FIGS. 1-A and 1-B).

(2) Identification of OUMS1 Strain Isolated from Water Purification Plant in Joyo City, Kyoto The OUMS1 strain was cultured on a JOP agar plate at 23° C. for 10 days. 1 mL of a TE buffer (10 mM Tris/1 mM EDTA) was added to the plate, and the cells were scraped with a cell scraper (produced by TRP) and collected into an Eppendorf tube. Thereafter, the cells were collected by centrifugation at 5,000 g for 10 min. The genomic DNA was extracted by the CTAB method, and the 16S rDNA region was amplified by PCR with the following primers.

```
5'-AGA GTT TGA TCM TGG CTC AG-3'

5'-GGY TAC CTT GTT ACG ACT T-3'
```

The amplified fragments were TA-cloned using a TA PCR cloning kit (produced by BioDynamics Laboratory Inc.), and DNA sequencing was performed by the dideoxy method (Sanger method). The obtained DNA sequence was equal to the nucleotide sequence of SEQ ID NO: 1. A homology search was performed for the nucleotide sequence of 16S ribosomal DNA using BLAST of the DDBJ.

FIGS. 2-A and 2-B show the results of the homology search. The results showed 99% homology with the 16S ribosomal DNA nucleotide sequence (Reference 2) of a known iron-oxidizing bacteria *Leptothrix cholodnii* SP-6 strain (Reference 1).

Reference 1: Emerson, D. and Ghiorse, W. C. Isolation, Cultural Maintenance, and Taxonomy of a Sheath-Forming Strain of *Leptothrix discophora* and Characterization of Manganese-Oxidizing Activity Associated with the Sheath. Appl. Environ. Microbiol. 58, 4001-4010 (1992)

Reference 2: Spring, S., Kampfer, P., Ludwig, W. and Schleifer, K. H. Polyphasic characterization of the genus *Leptothrix*: new descriptions of *Leptothrix mobilis* sp. nov. and *Leptothrix discophora* sp. nov. nom. rev. and amended description of *Leptothrix cholodnii* emend Syst. Appl. Microbiol. 19, 634-643 (1996)

The OUMS1 strain was cultured at 20° C. for 4 days in an MSVP (see, for example, Mulder, E. G., and W. L. van Veen Investigations on the *Sphaerotilus-Leptothrix* group. Ant, v. Leeuwhoek 29, 121-153 (1963)) liquid medium, and the proliferated bacterial cells were collected. Then, the genomic DNA was extracted by the CTAB method, and genomic DNA analysis was performed in accordance with the random amplified polymorphic DNA (RAPD) method, so as to make a comparison with the genomic DNA of a known iron-oxidizing bacteria *Leptothrix cholodnii* SP-6 strain. FIG. 3 shows the genomic DNA electrophoretic patterns of the OUMS1 strain and a known iron-oxidizing bacteria *Leptothrix cholodnii* SP-6 strain.

As shown in FIG. 3, in all six types of primers used, the OUMS1 genomic DNA electrophoretic patterns were different from those of known SP-6 in terms of the length and the number of the amplified fragments. This clarifies that the OUMS1 strain differs from SP-6.

A portion of the OUMS1 strain colonies was scraped, transferred to a flask containing an MSVP liquid medium (Reference 1) containing manganese sulfate in place of iron sulfate, and cultured at 20° C. for 10 days in a shaking incubator (70 rpm). Thereafter, the increased suspended material was placed on a slide glass and observed with an optical microscope. The formation of a sheath-shaped oxide was confirmed.

The OUMS1 strain was the same as a known iron-oxidizing bacteria *Leptothrix cholodnii* SP-6 strain in terms of the shape of the culture colonies, sheath-shaped oxide formation capability, and manganese oxidation capability. Further, because the results of the homology search for the 16S ribosomal DNA nucleotide sequence confirmed that the OUMS1 strain showed 99% homology with a known iron-oxidizing bacteria *Leptothrix cholodnii* SP-6 strain, the OUMS1 strain was identified as known iron-oxidizing bacteria *Leptothrix cholodnii*. In addition, because a comparison of the genomic DNA electrophoretic patterns by the RAPD method confirmed that the OUMS1 strain differs from a known iron-oxidizing bacteria *Leptothrix cholodnii* SP-6 strain, the OUMS1 strain was designated as *Leptothrix cholodnii* OUMS1 strain (NITE BP-860).

4. Properties of Iron Oxide Formed by OUMS1

The crystal structure of the iron oxide formed by the OUMS1 strain was measured using X-ray diffraction (XRD), its composition was analyzed by energy-dispersive X-ray (EDX) analysis, and the microstructural observation was evaluated with a scanning electron microscope (SEM) and a transmission electron microscope (TEM).

FIGS. 4-A-1 to 4-A-14 and 4-B-1 and 4-B-2 show SEM images of the iron oxide formed by the OUMS1 strain. It was clear that almost all of the visible structures had a tubular (microtubular) shape on the order of microns. The outer diameter of the structure was about 1.6 to 3.7 μm, and the internal diameter was about 0.5 to 0.8 μm. The surface shape of the iron oxide formed by the OUMS1 strain can be roughly classified into three shapes. Specifically, a surface shape such that fibrous particles (fiber width: about 100 to 200 nm) are sparsely tangled as shown in FIGS. 4-A-1 to 4-A-6, a surface shape such that fibrous particles (fiber width: about 100 to 300 nm) are densely tangled as shown in FIGS. 4-A-7 to 4-A-11, and a surface shape comprising scaly particles as shown in FIGS. 4-A-12 to 4-A-14. In addition to these, an agglomerate as shown in FIG. 4-B-1, and a rod-shaped iron oxide having a thickness of about 1 μm shown in FIG. 4-B-2 were also observed.

Figure 6:
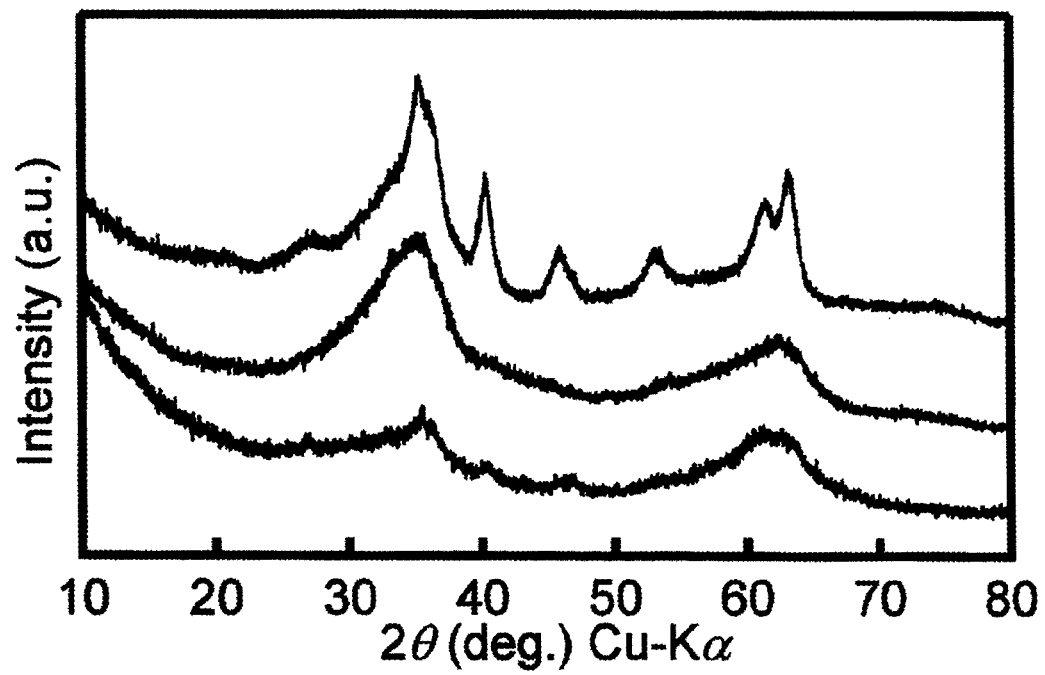
FIG. 6 shows X-ray diffraction (XRD) patterns of an iron oxide formed by OUMS1 strain.
Figure 7:
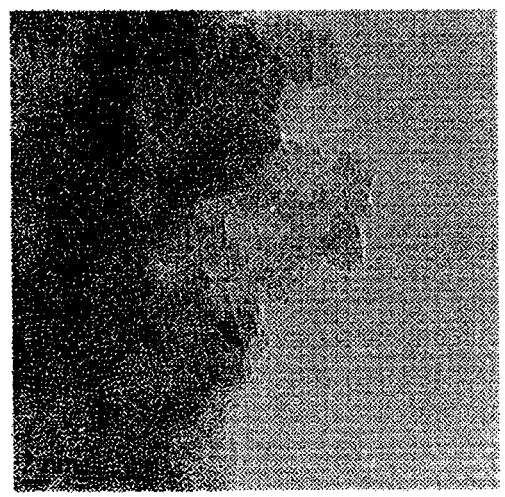
FIG. 7 shows a high-resolution TEM image of an iron oxide formed by OUMS1 strain.

FIGS. 5-1 to 5-13 show TEM images of the iron oxide formed by the OUMS1. In addition to the shapes shown in FIGS. 5-1 to 5-4, which are similar to the microtubular shapes observed in the SEM images above, the iron oxides of the following shapes were confirmed: a nanotubular shape having an outer diameter of about 350 to 400 nm, as shown in FIGS. 5-5 and 5-6, a hollow string shape having an outer diameter of about 500 nm and an internal diameter of about 180 nm, as shown in FIG. 5-7, a capsule shape having a major axis of about 1.5 to 5 μm and a minor axis of about 0.78 to 2.0 μm, as shown in FIGS. 5-8 to 5-10, a tubular shape whose one end is closed, having an outer diameter of about 350 nm and an internal diameter of about 230 nm, as shown in FIGS. 5-11, a string-and-sphere agglomerate shape as shown in FIG. 5-12, and a string shape as shown in FIG. 5-13. These results clarified that the OUMS1 formed an iron oxide having various shapes, such as a nanotubular shape; a hollow string shape; a capsule shape; a string-and-sphere agglomerate shape; and a string shape, in addition to a microtube-shaped iron oxide.

As a result of the composition analysis by EDX, it became clear that the constituent components of the iron oxide formed by the OUMS1 were Fe, O, Si, and P. Table 1 shows the average values and the standard deviations of the results of the analysis performed for 24 points. The composition excluding oxygen was Fe:Si:P=79.3:8.8:11.9. This iron oxide also contains a carbon atom and a hydrogen atom.

TABLE 1

| | Analytical Points: 24 | | | |
| --- | --- | --- | --- | --- |
| | Average | | Standard deviation | |
| Element | wt % | at % | wt % | at % |
| Si K | 4.9 | 8.8 | 1.5 | 2.8 |
| P K | 7.4 | 11.9 | 5.6 | 8.6 |
| Fe K | 87.7 | 79.3 | 4.4 | 6.2 |

FIG. 6 shows an XRD pattern of the iron oxide formed by the OUMS1 strain (lowest), and, as comparison samples, XRD patterns of 2-line ferrihydrite (2nd from the lowest) and 6-line ferrihydrite (3rd from the lowest). The iron oxide formed by the OUMS1 strain shows peaks that appear to be a combination of the peaks of 2-line ferrihydrite and 6-line ferrihydrite. These results clarified that the iron oxide formed by the OUMS1 was ferrihydrite.

FIG. 7 shows a high-resolution transmission electron microscope (HRTEM) image of a typical microtubular iron oxide formed by the OUMS1. This clarified that the iron oxide formed by the OUMS1 had a primary particle diameter of about 3 to 5 nm. Further, clear cross stripes were observed in the primary particles. This clarified that the iron oxide formed by the OUMS1 was a microcrystal aggregate.

The results of XRD measurement and HRTEM observation clarified that the iron oxide formed by the OUMS1 was an aggregate of ferrihydrite fine particles, the primary particle diameter thereof being about 3 to 5 nm.

5. Optimal Culture Condition for Promoting Proliferation of OUMS1 Strain and Facilitating Formation of Sheath-Shaped Lepidocrocite Oxide Using the OUMS1 isolated as above, lepidocrocite was prepared under the following culture conditions.

Figure 8:
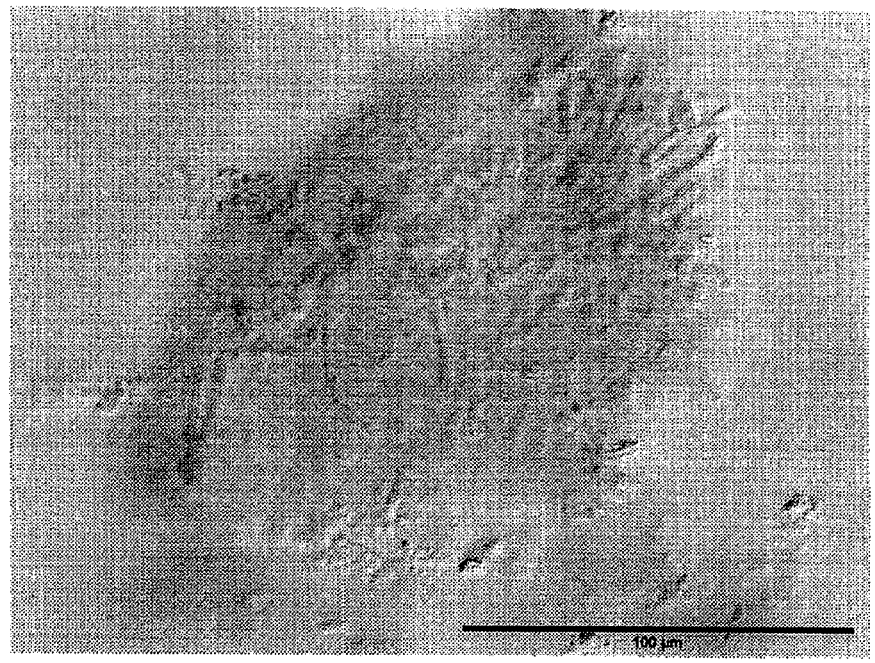
FIG. 8 shows an optical microscope image of an oxide in the shape of a sheath obtained after culturing an OUMS1 strain in a SIGP liquid medium.
Figure 9:
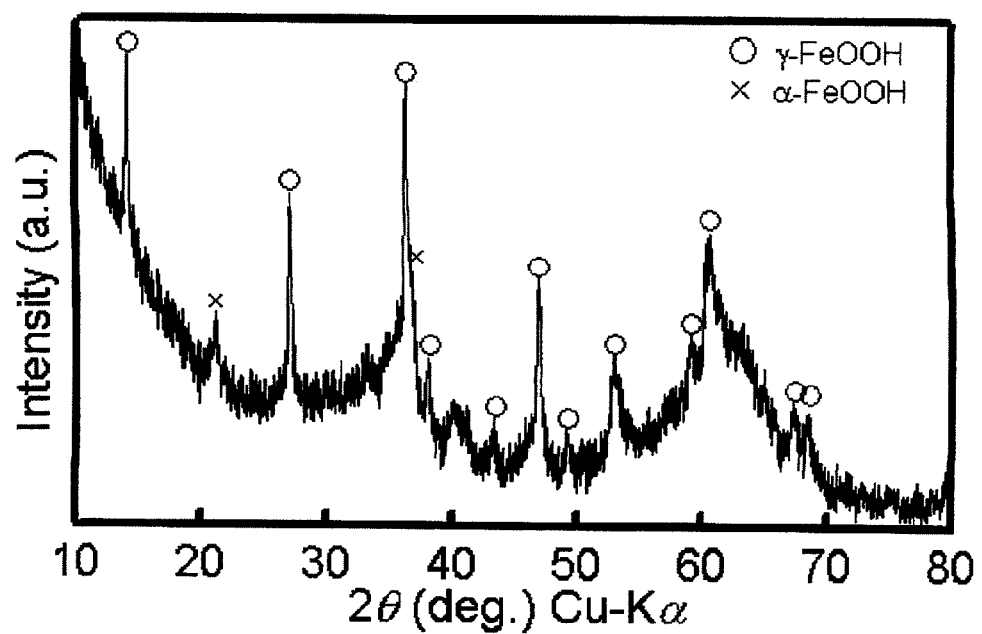
FIG. 9 shows an X-ray diffraction (XRD) pattern of an iron oxide formed by OUMS1 strain.

OUMS1 strain was introduced into an SIGP liquid medium (containing 1 g of glucose, 1 g of peptone, 0.2 g of sodium metasilicate nonahydrate, 0.044 g of calcium chloride dihydrate, 0.041 g of magnesium sulfate heptahydrate, 0.076 g of disodium hydrogenphosphate dodecahydrate, 0.02 g of potassium dihydrogenphosphate dihydrate, 2.383 g of HEPES, and 0.05 mM of iron sulfate, per liter of sterile distilled water, whose pH was adjusted to 7.0 with an aqueous sodium hydroxide solution) containing three pieces of iron fragments (purity: 99.9%, about 1 cm square), and sufficiently suspended. Thereafter, the resulting product was cultured at 20° C. for 14 days in a shaking incubator (70 rpm). After the completion of the culture, the surfaces of the iron fragments and the increased precipitate were observed with an optical microscope and a scanning electron microscope. The formation of a sheath-shaped oxide was confirmed (FIG. 8). Collected sediment was washed with about ten times the amount of distilled water, and then dried under reduced pressure. The XRD measurement of the dry powder revealed that the resulting sheath-shaped oxide was lepidocrocite (FIG. 9). Slight peaks attributable to goethite (α-FeOOH) were also confirmed. It revealed that the crystallite size (the minimum crystallite size in the direction perpendicular to the (200) plane) calculated based on the half-widths of reflection of (200) planes in an XRD pattern was 30 nm.

Devices Used for Analysis

Optical microscope: Olympus, BX-51 (FIGS. 1-A and 8)
X-ray diffraction (XRD) measurement: Rigaku Corporation, RINT-2000 (FIGS. 6 and 9)
Scanning electron microscope (SEM): Hitachi High-Technologies Corporation, Miniscope TM-1000 (FIGS. 1-B and 3-B)
Scanning electron microscope (SEM): JEOL Ltd., JSM-6700F (FIGS. 4-A and 4-B)
Energy Dispersive X-Ray (EDX) analysis: JEOL Ltd., JED-2200F (Table 1)
Transmission electron microscope (TEM): JEOL Ltd., JEM-2100F (FIGS. 5 and 7)

Example 1

In accordance with the following procedures (I), (II), and (III), the ceramic material obtained in isolation and purification (A) was subjected to heat treatment.

Procedure (I): A ceramic starting-material dry powder was fired using an OPM-28D electric muffle furnace produced by Advantech Co., Ltd., in atmospheric air at 800° C. for 2 hours. This operation was performed by rapid heating and quenching.

Figure 10:
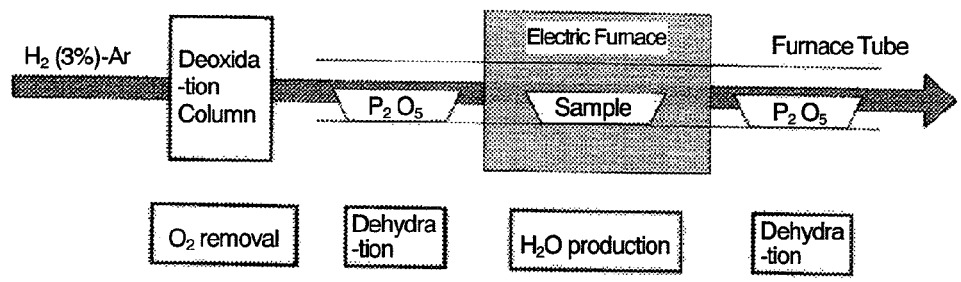
FIG. 10 schematically illustrates an electric furnace used in the hydrogen reduction step in procedure (II) of Example 1.

Procedure (II): The fired ceramic material obtained by procedure (I) was subjected to hydrogen reduction at 550° C. for 2 hours in an electric furnace (a tube furnace produced by Koyo Lindberg Ltd.) in the presence of an $H_2$ (3%)-Ar gas mixture (1 atmospheric pressure). FIG. 10 schematically illustrates the hydrogen reduction step in procedure (II). A deoxidation column (a Large Oxy-Trap produced by GL Sciences Inc.) was disposed immediately in front of the $H_2$ (3%)-Ar gas mixture (0.1 MPa) inlet of the electric furnace, and $P_2O_5$ was positioned at the front and back sides of the electric furnace containing the ceramic starting material to thereby perform the reduction treatment while removing traces of oxygen in the gas as well as the moisture generated during the reaction. Before the reduction treatment, the inside of the furnace was evacuated and then filled with the $H_2$ (3%)—Ar gas mixture. The gas flow rate during the reaction was adjusted to 100 ccm. The temperature increase rate was 10° C./min, and the cooling was achieved by quenching.

Procedure (III): The sample obtained by procedure (II) of Example 1 was heated using an OPM-28D electric muffle furnace produced by Advantech Co., Ltd., in atmospheric air at 250° C. for 2 hours. This operation was performed by rapid heating and quenching.

The sample obtained by procedure (I) of Example 1, the sample obtained by procedures (I) and (II) of Example 1, and the sample obtained by procedures (I) to (III) of Example 1 were evaluated by X-ray diffraction (XRD) measurement, a scanning electron microscope (SEM), elemental analysis, elemental mapping, Mössbauer spectroscopy, a vibrating sample magnetometer (VSM), and the like. Analysis Examples 1 to 6 below show the evaluation results.

Analysis Example 1

XRD Measurement

Figure 11:
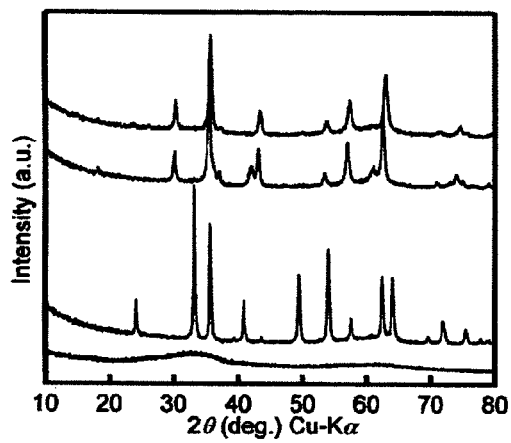
FIG. 11 shows XRD patterns of the sample obtained by procedure (I) of Example 1 (2nd from lowest), the sample obtained by procedures (I) and (II) of Example 1 (3rd from lowest), the sample obtained by procedures (I) to (III) of Example 1 (top), and the ceramic starting material (lowest).

The XRD patterns of the sample obtained by procedure (I) of Example 1, the sample obtained by procedures (I) and (II) of Example 1, the sample obtained by procedures (I) to (III) of Example 1, and the ceramic starting material were measured. FIG. 11 shows the results. For the XRD measuring device, an RINT-2000 produced by Rigaku Corporation was used. In the XRD patterns in FIG. 11, the lowest pattern corresponds to the ceramic starting material, the pattern second from the lowest corresponds to the sample obtained by procedure (I), the pattern third from the lowest corresponds to the sample obtained by procedures (I) and (II), and the top pattern corresponds to the sample obtained by procedures (I) to (III).

FIG. 11 confirmed the following: $\alpha$-$Fe_2O_3$ was formed almost in a single phase in the sample obtained by procedure (I), $Fe_3O_4$ was formed almost in a single phase in the sample obtained by procedures (I) and (II), and $\gamma$-$Fe_2O_3$ was formed almost in a single phase in the sample obtained by procedures (I) to (III).

Additionally, the lattice constants of the sample obtained by procedures (I) and (II) and the sample obtained by procedures (I) to (III) were calculated based on the XRD results. The calculated lattice constants were 8.397 Å and 8.344 Å, respectively. These lattice constants are in close agreement with the values of pure $Fe_3O_4$ and $\gamma$-$Fe_2O_3$ (8.396 Å and 8.347 Å). This confirmed that neither Si nor P in the form of solids was dissolved in the deposited magnetic iron oxide and that Fe, Si, and P were phase-separated.

The XRD patterns revealed no clear peaks originating from Si or P. This suggested that Si and P were forming an oxide having an amorphous structure. The crystallite size estimated based on the XRD patterns was confirmed as being about 20 nm.

Figure 12:
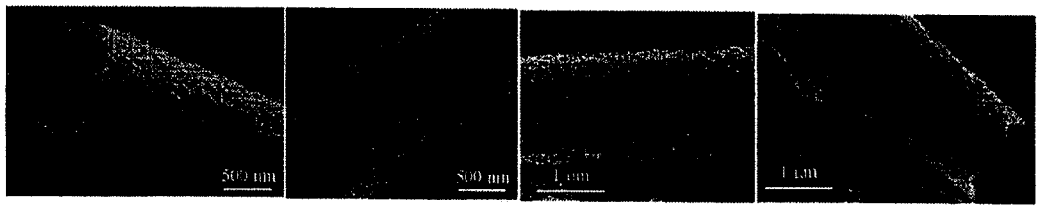
FIG. 12 shows SEM images of the sample obtained by procedure (I) of Example 1 (2nd from left), the sample obtained by procedures (I) and (II) of Example 1 (3rd from left), the sample obtained by procedures (I) to (III) of Example 1 (far right), and the ceramic starting material (far left).

FIG. 12 shows SEM images of the sample obtained by procedure (I) of Example 1, the sample obtained by procedures (I) and (II) of Example 1, the sample obtained by procedures (I) to (III) of Example 1, and the ceramic starting material. SEM was performed using a Hitachi S-4300 produced by Hitachi, Ltd. FIG. 12 confirmed that the tubular shape of the ceramic starting material was mostly maintained in the sample obtained by procedure (I), the sample obtained by procedures (I) and (II), and the sample obtained by procedures (I) to (III). It was also confirmed that almost no difference was found in the surface shape between the sample obtained by procedures (I) and (II) and the sample obtained by procedures (I) to (III).

Analysis Example 2

Elemental Analysis

Figure 13:
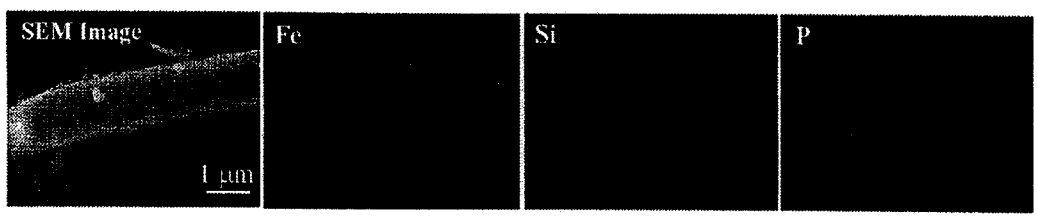
FIG. 13 shows the elemental mapping of the sample obtained by procedures (I) and (II) of Example 1.

According to the results of the elemental analysis of the sample obtained by procedures (I) and (II) of Example 1, the sample had the same composition ratio as that of the ceramic starting material. Specifically, for the sample obtained by procedure (II), Fe:Si:P was 73:23:4, and for the ceramic starting material, Fe:Si:P was 73:22:5. FIG. 13 shows the elemental mapping results. The EDAX Genesis 2000 produced by Ametek, Inc., was used for the EDX elemental analysis. Although Fe, and Si and P were phase-separated, all the elements were uniformly distributed on the order of submicrons. These results suggest that the phase separation of Fe, and Si and P occurs on the nano order.

Analysis Example 3

Chemical State Analysis of Iron Based on Mössbauer Spectroscopy

Figure 14:
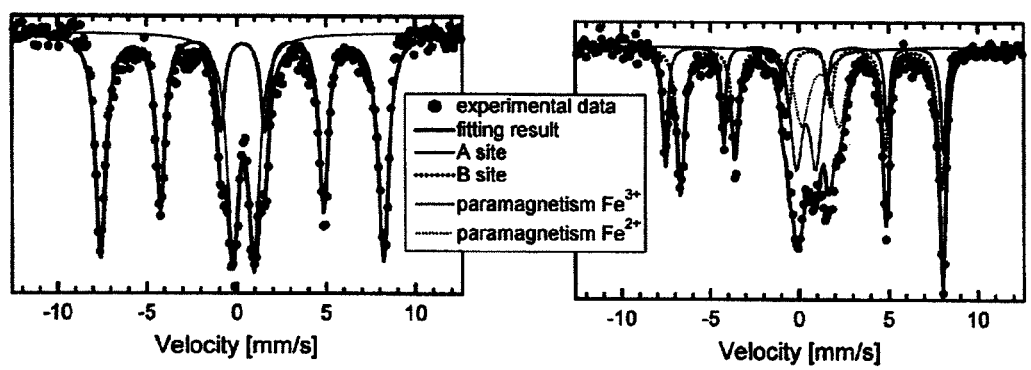
FIG. 14 shows Mössbauer spectra of the sample obtained by procedures (I) and (II) of Example 1 (left) and the sample obtained by procedures (I) to (III) of Example 1 (right).

FIG. 14 shows the Mössbauer spectra of the sample obtained by procedures (I) and (II) of Example 1 and the sample obtained by procedures (I) to (III) of Example 1. The MDF-200 produced by Toyo Researches (currently Topologic Systems, Inc.) was used for the Mössbauer spectroscopy measurement. The Mössbauer spectra confirmed that about 60 percent of the Fe contained in the sample obtained by procedures (I) and (II) was $Fe_3O_4$, and about 40 percent was paramagnetic $Fe^{2+}$ and $Fe^{3+}$. It was also confirmed that about 70 percent of the Fe contained in the sample obtained by procedures (I) to (III) was $\delta$-$Fe_2O_3$, and about 30 percent was paramagnetic $Fe^{2+}$ and $Fe^{3+}$.

Here, assuming that the paramagnetic $Fe^{2+}$ and $Fe^{3+}$ components were the Fe components constituting the amorphous phase, the composition of the amorphous phase was calculated based on the results of Mössbauer spectroscopy and the composition ratio of the ceramic starting material, i.e., Fe:Si:P=73:22:5. As a result, the composition of the amorphous phase of the sample obtained by procedures (I) and (II) of Example 1 was Fe:Si:P=52:39:9 by atomic %, and the composition of the amorphous phase of the sample obtained by procedures (I) to (III) was Fe:Si:P=45:45:10 by atomic %. Table 2 shows the composition of the amorphous phase.

TABLE 2

|  | Fe | Si | P |
|---|---|---|---|
| Starting ceramic material | 73 | 22 | 5 |
| Sample obtained by procedures (I) and (II) of Example 1 | 52 | 39 | 9 |
| Sample obtained by procedures (I) to (III) of Example 1 | 45 | 45 | 10 |

Analysis Example 4

Evaluation of Magnetic Properties Using VSM

Figure 15:
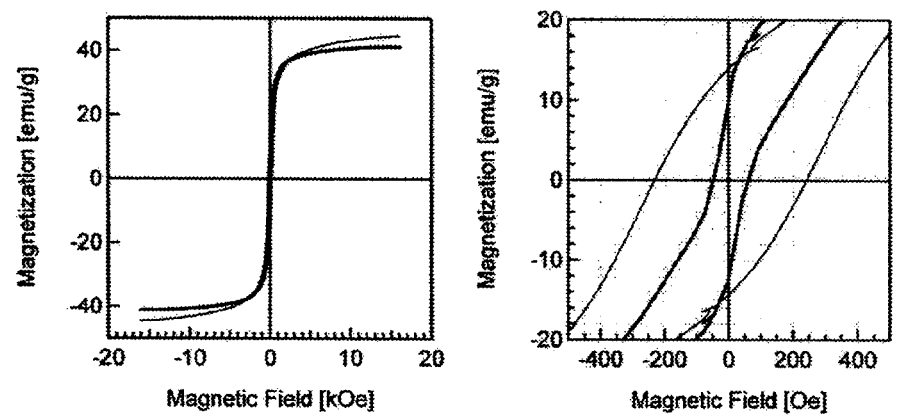
FIG. 15 shows M-H curves of the sample obtained by procedures (I) and (II) of Example 1 (thinner line) and the sample obtained by procedures (I) to (III) of Example 1 (thicker line).

Using a vibrating sample magnetometer (VSM-5-15, produced by Toei Industry Co., Ltd.), the magnetic properties of the sample obtained by procedures (I) and (II) of Example 1 and the sample obtained by procedures (I) to (III) of Example 1 were measured. FIG. 15 and Table 3 show the results.

TABLE 3

|  | Saturation magnetization (emu/g) | Coercivity (Oe) | Residual magnetization (emu/g) |
|---|---|---|---|
| Sample obtained by procedures (I) and (II) of Example 1 | 45 | 235 | 14 |
| Sample obtained by procedures (I) to (III) of Example 1 | 41 | 55 | 11 |

The sample obtained by procedures (I) and (II) of Example 1 had a saturation magnetization of 45 emu/g, a coercivity of 235 Oe, and a residual magnetization of 14 emu/g, and the sample obtained by procedures (I) to (III) had a saturation magnetization of 41 emu/g, a coercivity of 55 Oe, and a residual magnetization of 11 emu/g. It was thereby confirmed that these samples exhibited ferrimagnetism. The saturation magnetization values of pure $Fe_3O_4$ and $\gamma$-$Fe_2O_3$ are 98 emu/g and 81 emu/g, respectively. In view of this, it was confirmed that about 50 wt. % of the sample obtained by procedures (I) and (II) of Example 1 or by procedures (I) to (III) of Example 1 was magnetic iron oxide fine particles, and the other about 50 wt. % of the sample was an amorphous phase comprising oxides of Fe, Si, and P.

Analysis Example 5

Figure 17:
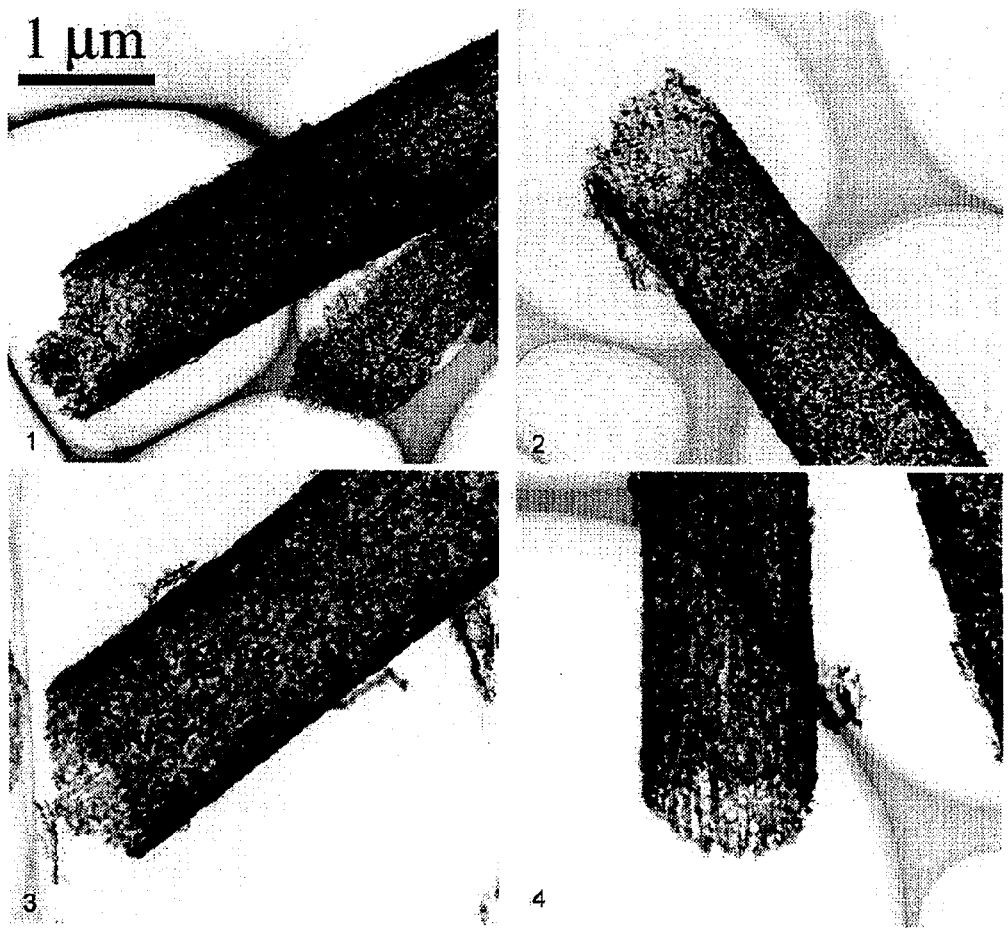
FIG. 17 shows TEM images (low magnification) of the untreated sample 1, the sample 2 obtained by procedure (I) of Example 1, the sample 3 obtained by procedures (I) and (II) of Example 1, and the sample 4 obtained by procedures (I) to (III) of Example 1.
Figure 19:
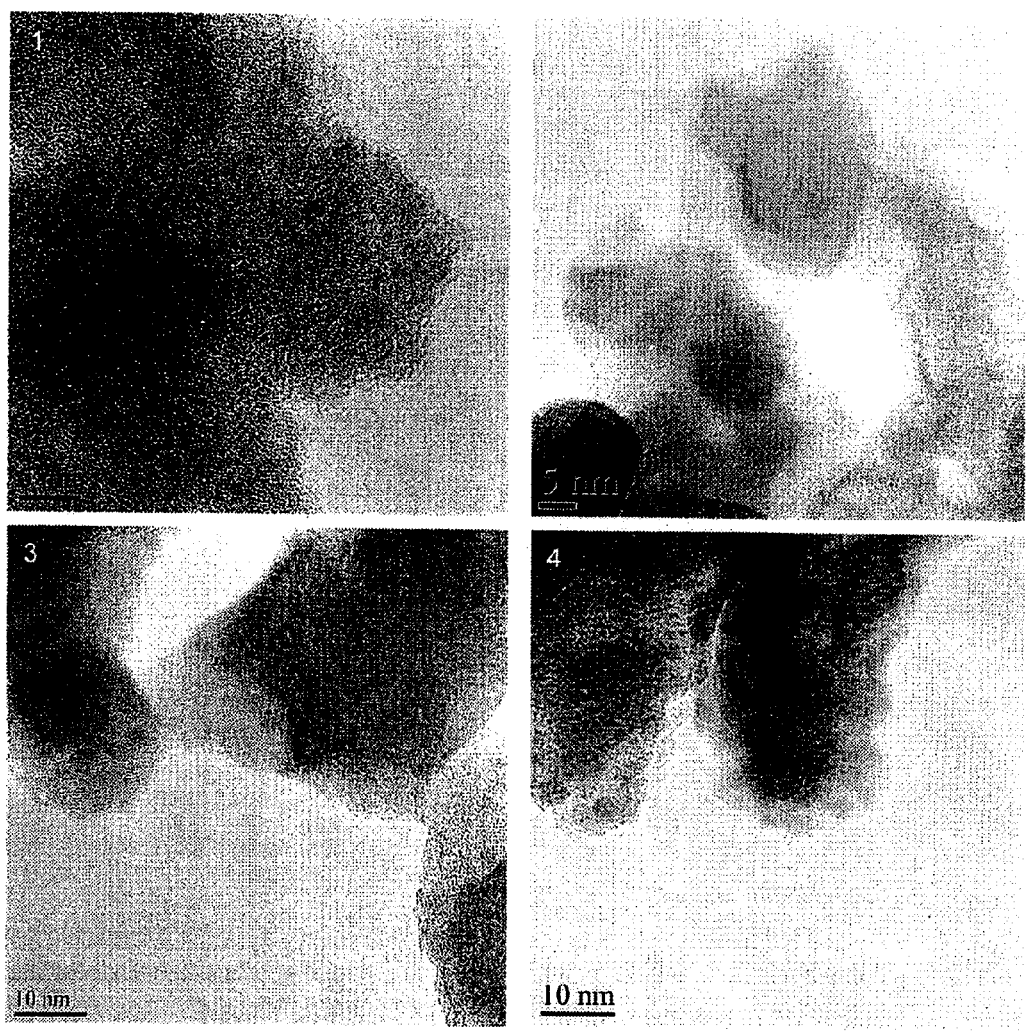
FIG. 19 shows HRTEM images (high magnification) of the untreated sample 1, the sample 2 obtained by procedure (I) of Example 1, the sample 3 obtained by procedures (I) and (II) of Example 1, and the sample 4 obtained by procedures (I) to (III) of Example 1.

FIG. 17 shows TEM images of an untreated sample, the sample obtained by procedure (I) of Example 1, the sample obtained by procedures (I) and (II) of Example 1, and the sample obtained by procedures (I) to (III) of Example 1. It was clarified that the samples maintained their tubular shape throughout the heating steps. FIG. 18 shows ultra-high resolution SEM images of each sample. It was clarified that the untreated sample had a muskmelon-like fibrous surface, while the sample obtained by procedure (I) (800° C., heated in atmospheric air) had a surface shape in which fibrous particles were disintegrated into fine particles. The sample of ferrimagnetism iron oxide obtained by procedures (I) and (II) had a surface shape similar to that of the sample obtained by procedures (I) to (III). Specifically, the surface had an appearance of being covered by a glass layer. FIG. 19 shows HRTEM images of each sample. It was clarified that the untreated sample, which is a starting material, had an atomic arrangement with a random, amorphous structure, while in all of the samples after heat treatment, the crystalline particle vicinity was covered by an amorphous phase. The EDX results showed that the amorphous phase was $SiO_2$ (silica).

The above results clarified that the heat-treatment process greatly changes the surface shape and element distribution. It was clarified that in all of the samples after heat treatment, the crystalline iron oxide (about 30 nm) was coated with amorphous silica.

Analysis Example 6

Figure 20:
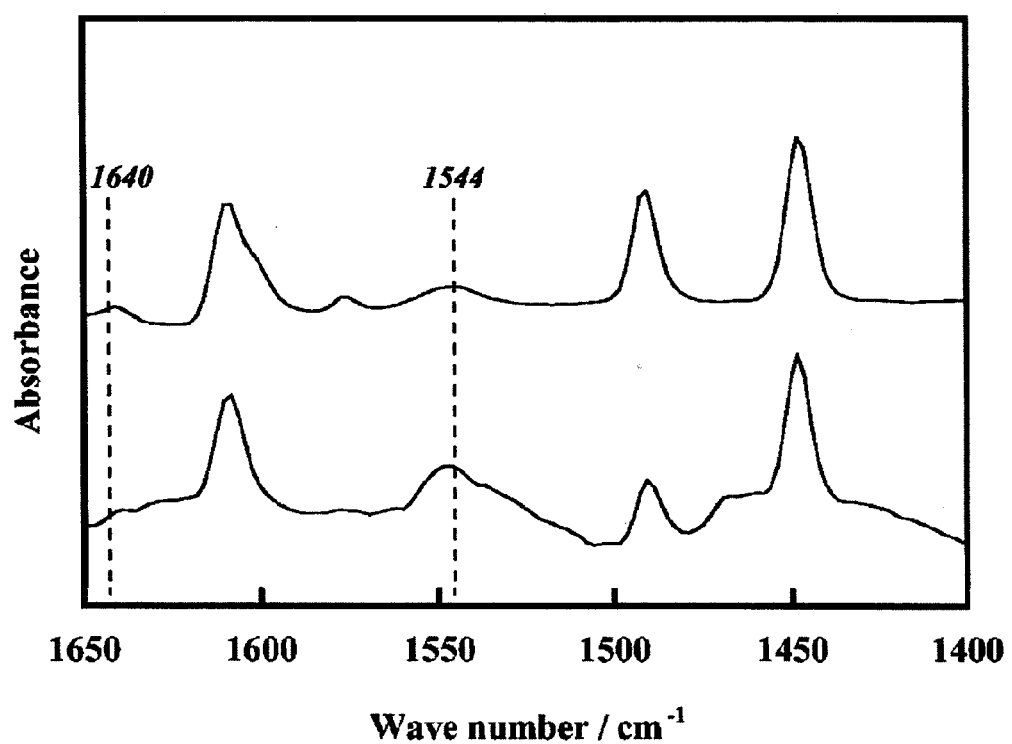
FIG. 20 shows IR spectra of pyridine strongly adsorbed at room temperature on the sample obtained by procedure (I) of Example 1 (upper) and on the sample obtained by procedures (I) to (III) of Example 1 (lower).

Subsequently, the infrared (IR) absorption spectra of the sample obtained by procedure (I) of Example 1 and the sample obtained by procedures (I) to (III) of Example 1 were recorded to study the surface properties thereof. The sample obtained by procedures (I) and (II) was black in color so that IR did not pass therethrough, and no records were thus obtained. Here, pyridine gas was used as a probe for defining the properties of the surface of each sample. FIG. 20 shows IR spectra of pyridine species strongly adsorbed at room temperature on the sample obtained by procedure (I) and the sample obtained by procedures (I) to (III). As is clear from the figure, the appearance of several IR bands was observed. In particular, attention should be paid to the appearance of the bands at 1,640 cm$^{-1}$ and 1,544 cm$^{-1}$. Generally, IR bands observed around this region are attributable to pyridine species that adsorb on Brønsted acid sites in zeolites, etc., which are known as a solid acid catalyst. Therefore, in consideration of the HRTEM results (FIG. 19) and the STEM-EDX results, it was revealed that the surface of the sample obtained by procedure (I) and the surface of the sample obtained by procedures (I) to (III), which were covered with amorphous silica, had an acid property similar to Brønsted acidity (acid sites were present on the surface). Considering that amorphous silica itself is originally neutral, the fact revealed by the present invention is of great interest, i.e., the sample obtained by procedure (I) and $\gamma$-$Fe_2O_3$-BIOX, whose surfaces are covered with amorphous silica, have acid properties. This suggests the availability of the sample obtained by procedure (I) and the sample obtained by procedures (I) to (III) as a novel solid acid catalyst. Further, because the sample obtained by procedure (I) and the sample obtained by procedures (I) to (III) have acid properties, the sample obtained in the course of the procedures, i.e., the sample obtained by procedures (I) and (II), is also expected to have acidic sites.

The invention claimed is:

1. A magnetic ceramic material comprising, as main components, (a) at least one magnetic iron oxide selected from the group consisting of $Fe_3O_4$ and $\gamma\text{-}Fe_2O_3$, and
(b) an amorphous phase,
wherein the magnetic ceramic material is obtained by heating a microorganism-derived ceramic material containing iron, silicon, and phosphorus.

2. The magnetic ceramic material according to claim 1, wherein the magnetic iron oxide content is 30 to 50 mass %, and the amorphous phase content is 70 to 50 mass %.

3. The magnetic ceramic material according to claim 1, wherein the amorphous phase contains oxides of iron, silicon, and phosphorus.

4. The magnetic ceramic material according to claim 3, wherein the silicon oxide content is 10 to 30 mass % based on the mass of the magnetic ceramic material.

5. The magnetic ceramic material according to claim 3, wherein the phosphorus oxide content is 1 to 20 mass % based on the mass of the magnetic ceramic material.

6. The magnetic ceramic material according to claim 1, wherein the surface is in the shape of a fine irregular structure.

7. The magnetic ceramic material according to claim 1, wherein the magnetic ceramic material contains an acidic hydroxyl group.

8. The magnetic ceramic material according to claim 7, wherein acidic sites are observed from peaks of IR absorption at 1,640 $cm^{-1}$ and 1,544 $cm^{-1}$ attributable to pyridine adsorbed to the magnetic ceramic material.

9. The magnetic ceramic material according to claim 1, wherein the microorganism is an iron bacterium.

10. A process for producing a magnetic ceramic material, comprising
(1) heating a microorganism-derived iron oxide ceramic material containing iron, silicon, and phosphorus, and
(2) reducing the iron oxide ceramic material obtained in Step (1) by heating in the presence of hydrogen gas.

11. The process according to claim 10, further comprising (3) heating the magnetic ceramic material obtained in Step (2) in the presence of oxygen gas.

12. The process according to claim 11, wherein the heating temperature in Step (3) is 100 to 300° C.

13. The process according to claim 10, wherein the heating temperature in Step (1) is 700 to 900° C.

14. The process according to claim 10, wherein the heating temperature in Step (2) is 400 to 650° C.

* * * * *

SEQUENCE LISTING

<160> NUMBER OF SEQ ID NOS: 9

<210> SEQ ID NO 1
<211> LENGTH: 1418
<212> TYPE: DNA
<213> ORGANISM: Leptothrix cholodnii

<400> SEQUENCE: 1

| | | | | | |
|---|---|---|---|---|---:|
| catgccttac | acatgcaagt | cgaacggtag | aggagcaatc | ctcgagagtg | gcgaacgggt | 60 |
| gagtaatgta | tcggaacgtg | cccagtagtg | ggggatagcc | cggcgaaagc | cggattaata | 120 |
| ccgcatgaga | cctgagggtg | aaagcggggg | actcgcaagg | gcctcgcgct | actggagcgg | 180 |
| ccgatatcag | attaggtagt | tggtggggta | aaagcctacc | aagcctgcga | tctgtagctg | 240 |
| gtctgagagg | acgaccagcc | acactgggac | tgagacacgg | cccagactcc | tacgggaggc | 300 |
| agcagtgggg | aattttggac | aatgggcgaa | agcctgatcc | agccatgccg | cgtgcgggaa | 360 |
| gaaggccttc | gggttgtaaa | ccgcttttgt | cagggaagaa | atcctttgag | ttaataccctc | 420 |
| ggagggatga | cggtacctga | agaataagca | ccggctaact | acgtgccagc | agccgcggta | 480 |
| atacgtaggg | tgcaagcgtt | aatcggaatt | actgggcgta | aagcgtgcgc | aggcggttgt | 540 |
| gtaagacaga | tgtgaaatcc | ccgggctcaa | cctgggaact | gcatttgtga | ctgcacagct | 600 |
| agagtacggt | agaggggggat | ggaattccgc | gtgtagcagt | gaaatgcgta | gatatgcgga | 660 |
| ggaacaccga | tggcgaaggc | aatcccctgg | acctgtactg | acgctcatgc | acgaaagcgt | 720 |
| ggggagcaaa | caggattaga | taccctggta | gtccacgccc | taaacgatgt | caactggttg | 780 |
| ttgggagggt | tcttctcag | taacgaagct | aacgcgtgaa | gttgaccgcc | tggggagtac | 840 |
| ggccgcaagg | ttgaaactca | aaggaattga | cggggacccg | cacaagcggt | ggatgatgtg | 900 |
| gtttaattcg | atgcaacgcg | aaaaaccttta | cctacccttg | acatgtcaag | aatcttgcag | 960 |
| agatgtggga | gtgctcgaaa | gagaacttga | acacaggtgc | tgcatggccg | tcgtcagctc | 1020 |
| gtgtcgtgag | atgttgggtt | aagtcccgca | acgagcgcaa | cccttgtcat | tagttgctac | 1080 |
| gaaagggcac | tctaatgaga | ctgccggtga | caaaccggag | gaaggtgggg | atgacgtcag | 1140 |
| gtcctcatgg | cccttatggg | tagggctaca | cacgtcatac | aatggccggt | acagagggca | 1200 |
| gccaacccgc | gagggggagc | caatcccaga | aaaccggtcg | tagtccggat | cgcagtctgc | 1260 |
| aactcgactg | cgtgaagtcg | gaatcgctag | taatcgcgga | tcagcttgcc | gcggtgaata | 1320 |
| cgttcccggg | tcttgtacac | accgcccgtc | acaccatggg | agcgggttct | gccagaagta | 1380 |
| gttagcctaa | ccgcaaggag | ggcgattacc | acggcagg | | | 1418 |

<210> SEQ ID NO 2
<211> LENGTH: 20
<212> TYPE: DNA
<213> ORGANISM: Artificial Sequence
<220> FEATURE:
<223> OTHER INFORMATION: primer

<400> SEQUENCE: 2
agagtttgat cmtggctcag                                              20

<210> SEQ ID NO 3
<211> LENGTH: 19
<212> TYPE: DNA
<213> ORGANISM: Artificial Sequence
<220> FEATURE:
<223> OTHER INFORMATION: primer

```
<400> SEQUENCE: 3
ggytaccttg ttacgactt                                                    19

<210> SEQ ID NO 4
<211> LENGTH: 10
<212> TYPE: DNA
<213> ORGANISM: Artificial Sequence
<220> FEATURE:
<223> OTHER INFORMATION: primer

<400> SEQUENCE: 4
ggtgcgggaa                                                              10

<210> SEQ ID NO 5
<211> LENGTH: 10
<212> TYPE: DNA
<213> ORGANISM: Artificial Sequence
<220> FEATURE:
<223> OTHER INFORMATION: primer

<400> SEQUENCE: 5
gtttcgctcc                                                              10

<210> SEQ ID NO 6
<211> LENGTH: 10
<212> TYPE: DNA
<213> ORGANISM: Artificial Sequence
<220> FEATURE:
<223> OTHER INFORMATION: primer

<400> SEQUENCE: 6
gtagacccgt                                                              10

<210> SEQ ID NO 7
<211> LENGTH: 10
<212> TYPE: DNA
<213> ORGANISM: Artificial Sequence
<220> FEATURE:
<223> OTHER INFORMATION: primer

<400> SEQUENCE: 7
aagagcccgt                                                              10

<210> SEQ ID NO 8
<211> LENGTH: 10
<212> TYPE: DNA
<213> ORGANISM: Artificial Sequence
<220> FEATURE:
<223> OTHER INFORMATION: primer

<400> SEQUENCE: 8
aacgcgcaac                                                              10

<210> SEQ ID NO 9
<211> LENGTH: 10
<212> TYPE: DNA
<213> ORGANISM: Artificial Sequence
<220> FEATURE:
<223> OTHER INFORMATION: primer

<400> SEQUENCE: 9
cccgtcagca                                                              10
```